United States Patent
Goto

(10) Patent No.: US 11,325,258 B2
(45) Date of Patent: May 10, 2022

(54) GUIDANCE APPARATUS AND METHOD FOR FAILURE RECOVERY

(71) Applicant: FANUC CORPORATION, Yamanashi (JP)

(72) Inventor: Kazuya Goto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 402 days.

(21) Appl. No.: 16/521,884

(22) Filed: Jul. 25, 2019

(65) Prior Publication Data

US 2020/0086489 A1 Mar. 19, 2020

(30) Foreign Application Priority Data

Sep. 14, 2018 (JP) .............................. JP2018-172414

(51) Int. Cl.
*B25J 13/06* (2006.01)
*B25J 9/16* (2006.01)
(Continued)

(52) U.S. Cl.
CPC .............. *B25J 9/1676* (2013.01); *B25J 19/06* (2013.01); *G05B 19/4155* (2013.01); *G06F 3/14* (2013.01);
(Continued)

(58) Field of Classification Search
CPC .......... B25J 19/06; B25J 9/1676; B25J 13/06; G05B 19/4155; G05B 2219/33099;
(Continued)

(56) References Cited

U.S. PATENT DOCUMENTS 6,438,455 B2 * 8/2002 Matsumoto ............ B25J 9/1674
318/567
6,459,956 B2 * 10/2002 Matsumoto .............. B25J 19/06
318/563
(Continued)

FOREIGN PATENT DOCUMENTS

JP 2000-270430 9/2000
JP 2002-189513 7/2002
(Continued)

OTHER PUBLICATIONS

Sarker et al., A Review of Sensing and Communication, Human Factors, and Controller Aspects for Information-Aware Connected and Automated Vehicles, 2019, IEEE ,p. 1-23 (Year: 2019).*
(Continued)

*Primary Examiner* — Marc McDieunel
(74) *Attorney, Agent, or Firm* — Wenderoth, Lind & Ponack, L.L.P.

(57) ABSTRACT

To assist appropriately in performing a recovery operation of a device. A guidance information presentation apparatus includes: a guidance information receiving unit configured to acquire guidance information including access information and safety information, the access information including a moving route to reach an estimated location of a failure in an apparatus as a recovery target, and an operation procedure, the safety information indicating safety of the moving route and the operation procedure in the access information; and a guidance information displaying unit configured to perform, on a basis of the guidance information, notification for a guidance of the moving route to the estimated location of the failure in the apparatus as the recovery target, and the operation procedure, and notification that indicates the safety of the moving route and the operation procedure.

12 Claims, 15 Drawing Sheets

(51) Int. Cl.
*G06F 3/14* (2006.01)
*G05B 19/4155* (2006.01)
*B25J 19/06* (2006.01)
*G08B 21/18* (2006.01)

(52) U.S. Cl.
CPC .. *G08B 21/187* (2013.01); *G05B 2219/33099* (2013.01)

(58) Field of Classification Search
CPC ........ G05B 19/042; G05B 2219/32014; G05B 2219/39449; G06F 3/14; G08B 21/187; G08B 21/02; G02B 27/0172; G02B 2027/0141; G02B 2027/0178; G02B 2027/0134; G02B 2027/014; G02B 2027/0138; G06T 19/006; G06B 1/163
See application file for complete search history.

(56) References Cited

U.S. PATENT DOCUMENTS

| | | | | |
|---|---|---|---|---|
| 10,994,427 B2* | 5/2021 | Watanabe | ................ | B25J 19/06 |
| 11,110,610 B2* | 9/2021 | Holmes | ................... | B25H 1/02 |
| 11,157,226 B2* | 10/2021 | Yamada | ............. | G02B 27/0172 |
| 2017/0001316 A1* | 1/2017 | Katayama | .............. | H05B 45/00 |
| 2018/0232593 A1* | 8/2018 | Tani | ......................... | B25J 19/06 |
| 2019/0129425 A1* | 5/2019 | Drexler | ................ | G05D 1/0214 |
| 2021/0303745 A1* | 9/2021 | Linkowski | .............. | G06T 17/05 |

FOREIGN PATENT DOCUMENTS

| | | |
|---|---|---|
| JP | 2011-248860 | 12/2011 |
| WO | 2016/194017 | 12/2016 |

OTHER PUBLICATIONS

Saleh et al., A Survey of Routing Algorithms in Vehicular Networks, 2019, IEEE, p. 159-164 (Year: 2019).*
Herbert et al., Route guidance: State of the art vs. state of the practice, 2008, IEEE, p. 1167-1174 (Year: 2009).*
Duan et al., A new human-robot collaboration assembly system for cellular manufacturing, 2011, IEEE, p. 5468-54 (Year: 2011).*
Notification of Reasons for Refusal dated Sep. 15, 2020 in Japanese Patent Application No. 2018-172414.

* cited by examiner

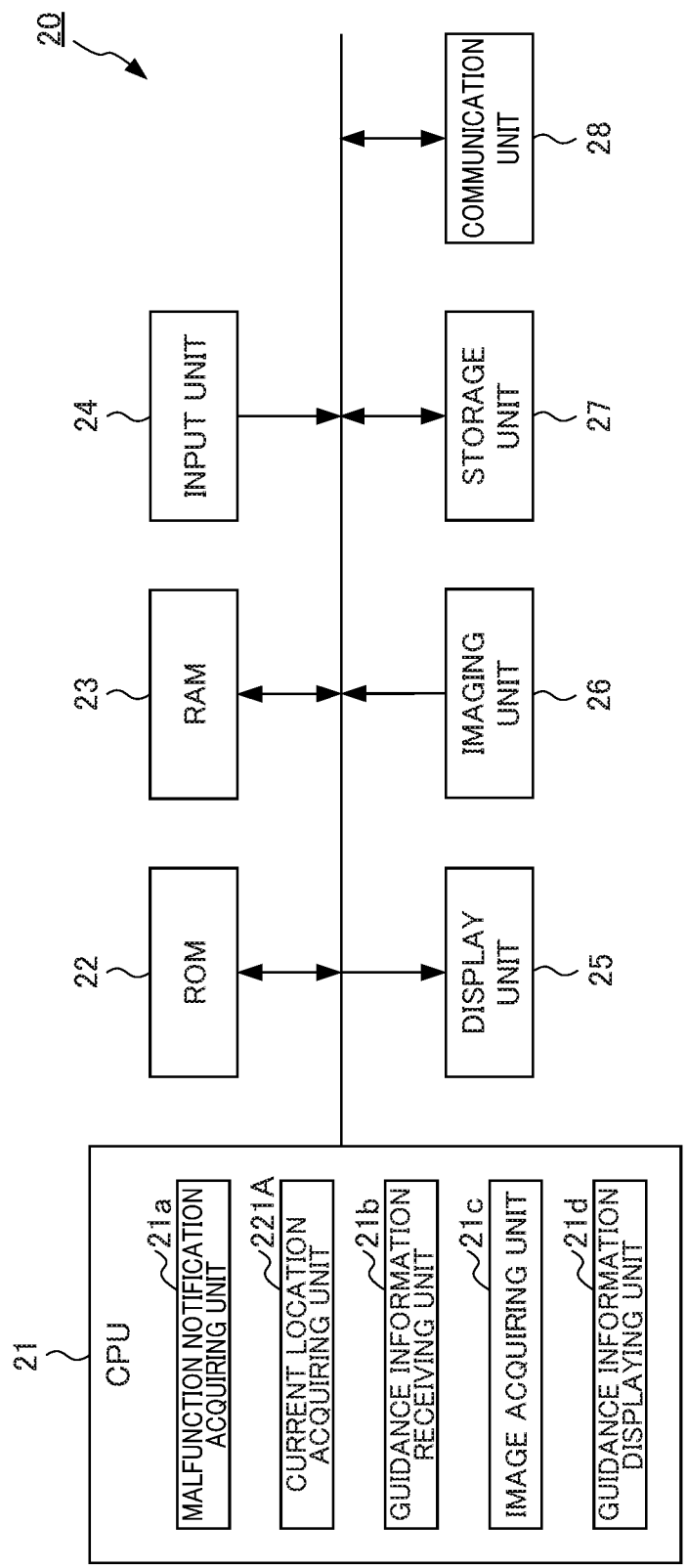

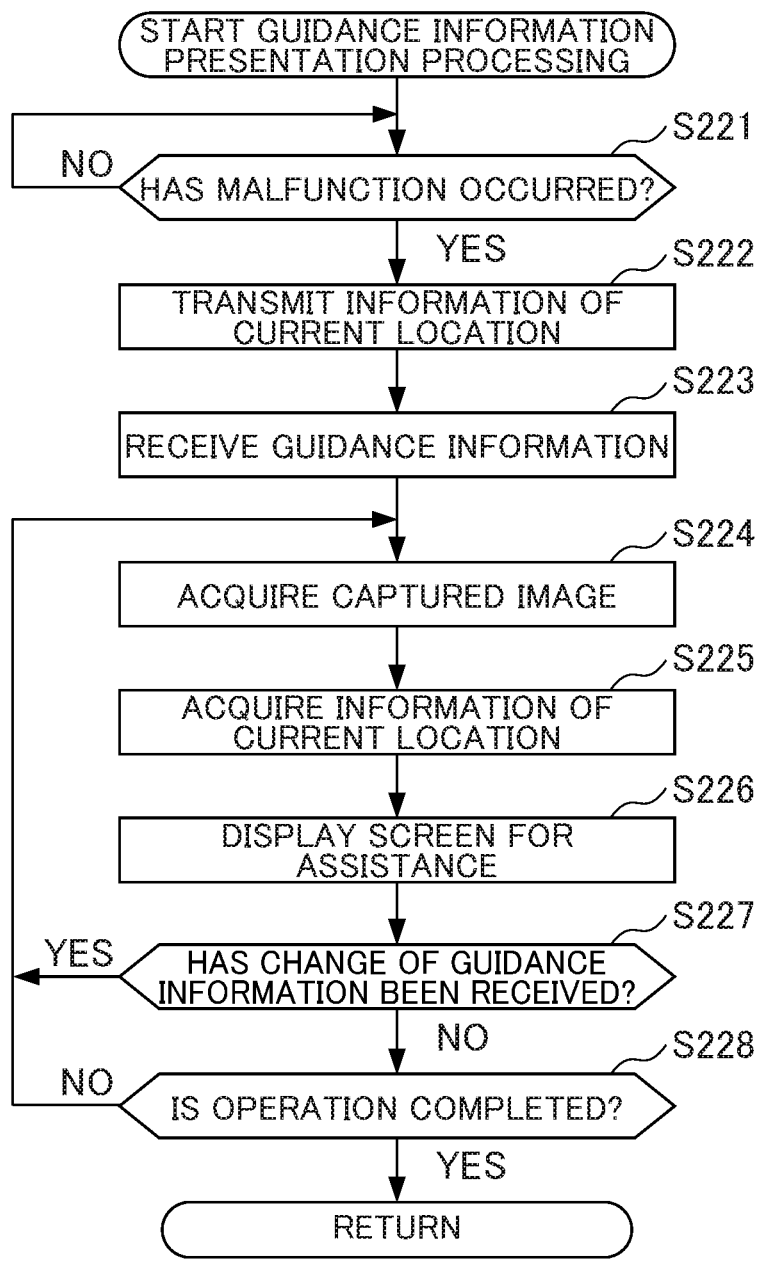

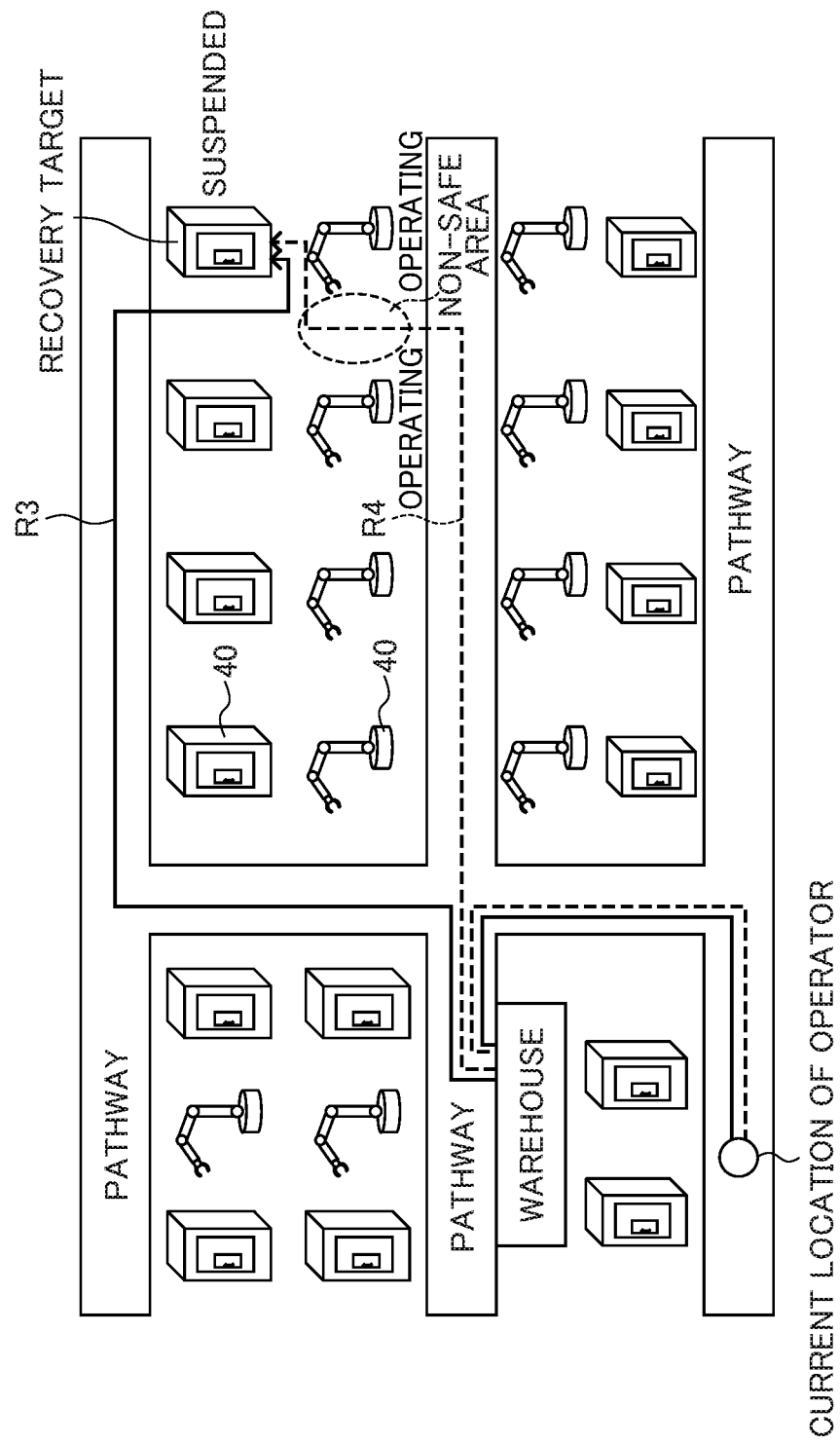

GUIDANCE APPARATUS AND METHOD FOR FAILURE RECOVERY

This application is based on and claims the benefit of priority from Japanese Patent Application No. 2018-172414, filed on 14 Sep. 2018, the content of which is incorporated herein by reference.

BACKGROUND OF THE INVENTION

Field of the Invention

The present disclosure relates to a guidance information presentation apparatus, a guidance information presentation server, a guidance information presentation system, a guidance information presentation method, and a non-transitory computer readable medium recording a program.

Related Art

Conventionally, a machine tool or a CNC (Computer Numerical Control) apparatus provided in the machine tool has been known which has a function of performing alarm messages or alarm displays (lighting of 7-segment LEDs or the like) in order to facilitate identification of failure factors when these devices fail. On the basis of the abovementioned alarm messages or alarm displays, an operator for the recovery of the apparatus estimates a failure location by referring to manuals, and performs the recovery of the apparatus by replacing a component, a printed circuit board, or the like in which the failure is estimated to have occurred. The manuals referred to at this time also describe methods for safely performing the recovery operation such as replacing the components. Japanese Unexamined Patent Application, Publication No. 2000-270430 describes a plant monitor assist system for assisting in monitoring a large-scale plant such as a nuclear power plant or a chemical plant.

Patent Document 1: Japanese Unexamined Patent Application, Publication No. 2000-270430

SUMMARY OF THE INVENTION

However, when recovering a machine tool or a CNC apparatus or the like provided in the machine tool, whether the machine serving as the recovery target is in a safe state or an unsafe state differs depending on the operating state of the machine. Further, even the same type of machines may differ in its safe route to the location where the recovery operation is to be performed, depending on the plant layout. In addition, since a malfunction recovery operation can be performed only by workers who can judge the safety as described above, maintenance costs are increased by educating workers and hiring service personnel, and the time required until malfunction recovery is lengthened. In addition, if an operator who is not aware of the safety as described above refers to the manuals while maintaining inadequate safety in order to expedite malfunction recovery, there is a possibility that an unexpected situation may occur, such as serious injury to the body. In addition, when a recovery operation is actually performed, it is necessary to carry a manual, search a corresponding location, and sequentially refer to the manual. This takes a long time for the recovery, which is an object of the present application. However, the prior art has not been able to adequately assist in performing the recovery operation of a device.

It is an object of the present disclosure to more appropriately assist in performing a recovery operation of a device.

A guidance information presentation apparatus (for example, a terminal device 20 as described later) according to a first aspect of the present invention includes a guidance information acquiring unit (for example, a guidance information receiving unit 21b as described later) configured to acquire guidance information including access information and safety information, the access information including a moving route to reach an estimated location of a failure in an apparatus as a recovery target (for example, a control device 30 and/or a machine 40), and an operation procedure, the safety information indicating safety of the moving route and the operation procedure in the access information, and a guidance information notification unit (for example, a guidance information displaying unit 21d as described later) configured to perform, on a basis of the guidance information, notification for guidance of the moving route to the estimated location of the failure in the apparatus as the recovery target, and the operation procedure, and notification that indicates the safety of the moving route and the operation procedure.

According to a second aspect of the present invention, in the guidance information presentation apparatus as described in the first aspect, the safety information may be generated on the basis of an operating state in the apparatus as the recovery target.

According to a third aspect of the present invention, in the guidance information presentation apparatus as described in the first or second aspect, the safety information may be generated on the basis of an operating state of an apparatus in the vicinity of the moving route.

According to a fourth aspect of the present invention, in the guidance information presentation apparatus as described in the first to third aspects, the safety information may be generated on the basis of whether each portion of pieces of the access information is included in either an area that is determined as being safe irrespective of an operating state of the apparatus, or an area that is determined as being non-safe when the apparatus is in operation and determined as being safe when the operation of the apparatus is suspended.

According to a fifth aspect of the present invention, in the guidance information presentation apparatus as described in the first to fourth aspects, the guidance information notification unit may perform notification of at least one of waiting until becoming safe or an operation to establish safe, as the guidance information for a portion that is determined as being non-safe in the access information.

According to a sixth aspect of the present invention, the guidance information presentation apparatus as described in the first to fifth aspects further includes an imaging unit (for example, an imaging unit 26 described later) that is configured to capture an image, in which the guidance information notification unit may recognize a subject in the image captured by the imaging unit and may display the guidance information relating to the recognized subject by superimposing the guidance information on the image.

According to a seventh aspect of the present invention, the guidance information presentation apparatus as described in the first to sixth aspects further includes a location acquiring unit (for example, a current location acquiring unit 221A as described later) that is configured to acquire a current location of the guidance information presentation apparatus, in which the access information in the guidance information may include a moving route from a current location of the guidance information presentation apparatus (20) acquired by the location acquiring unit (221A) to the apparatus as the recovery target.

According to an eighth aspect of the present invention, in the guidance information presentation apparatus as described in the seventh aspect, the access information in the guidance information may include a moving route from the current location of the guidance information presentation apparatus acquired by the location acquiring unit to a storage area in which components to be used for recovery operation in the apparatus as the recovery target are stored, and a moving route from the storage area to the apparatus as the recovery target.

According to a ninth aspect of the present invention, furthermore, a guidance information presentation server (for example, a server 10 as described later) of the present invention is guidance information presentation server that is configured to be communicable with a terminal device (for example, a terminal device 20), and the guidance information presentation server includes a guidance information generating unit (for example, a guidance information generating unit 11f) configured to generate guidance information including access information and safety information, the access information including a moving route to reach an estimated location of a failure in an apparatus as a recovery target (30, 40), and an operation procedure, the safety information indicating safety of the moving route and the operation procedure in the access information, and a guidance information transmitting unit (for example, a guidance information transmitting unit 11g) configured to transmit, to the terminal device (20), the guidance information generated by the guidance information generating unit.

According to a tenth aspect of the present invention, furthermore, a guidance information presentation system of the present invention is a guidance information presentation system including a server (for example, a server 10 described later) and a guidance information presentation apparatus (for example, a terminal device 20) that are configured to be communicable, in which the server includes a guidance information generating unit (for example, a guidance information generating unit 11f) configured to generate guidance information including access information and safety information, the access information including a moving route to reach an estimated location of a failure in an apparatus as a recovery target, and an operation procedure, the safety information indicating safety of the moving route and the operation procedure in the access information, and a guidance information transmitting unit (for example, a guidance information receiving unit 11g) configured to transmit, to the guidance information presentation apparatus, the guidance information generated by the guidance information generating unit, and the guidance information presentation apparatus includes a guidance information receiving unit (for example, a guidance information receiving unit 21b) that is configured to receive the guidance information, and a guidance information notification unit (for example, a guidance information displaying unit 21d) that is configured to perform, on a basis of the guidance information received by the guidance information receiving unit, notification for a guidance of the moving route to the estimated location of the failure in the apparatus as the recovery target, and the operation procedure, and notification that indicates the safety of the moving route and the operation procedure.

According to an eleventh aspect of the present invention, furthermore, a method of presenting guidance information of the present invention is a method of presenting guidance information executed by a computer, and the method includes acquiring guidance information including access information and safety information, the access information including a moving route to reach an estimated location of a failure in an apparatus as a recovery target, and an operation procedure, the safety information indicating safety of the moving route and the operation procedure in the access information, and performing, on a basis of the access information, notification for a guidance of the moving route to the estimated location of the failure in the apparatus as the recovery target, and the operation procedure, and notification that indicates the safety in the moving route and the operation procedure.

According to a twelfth aspect of the present invention, a program of the present invention is a program that causes a computer to realize a guidance information acquiring function that acquires guidance information including access information and safety information, the access information including a moving route to reach an estimated location of a failure in an apparatus as a recovery target, and an operation procedure, the safety information indicating safety of the moving route and the operation procedure in the access information, and a guidance information notification function that performs, on a basis of the guidance information, notification for a guidance of the moving route to the estimated location of the failure in the apparatus as the recovery target (30, 40), and the operation procedure, and notification that indicates the safety of the moving route and the operation procedure.

According to the present embodiment, it is possible to more appropriately assist in performing the recovery operation of a device.

BRIEF DESCRIPTION OF THE DRAWINGS

FIG. 13 is a block diagram illustrating the configuration of a terminal device in the second embodiment;

FIG. 14 is a flowchart for explaining a flow of guidance information display processing executed by the terminal device according to the second embodiment; and FIG. 15 is a schematic diagram illustrating an example of access information including a moving route from a current location of an operator to a location of a CNC apparatus or a machine tool as a recovery target via a warehouse or the like where a replacement component required for a recovery operation is picked up.

DETAILED DESCRIPTION OF THE INVENTION

Embodiments of the present invention will be described below with reference to the drawings.

First Embodiment (Configuration)

Figure 1:
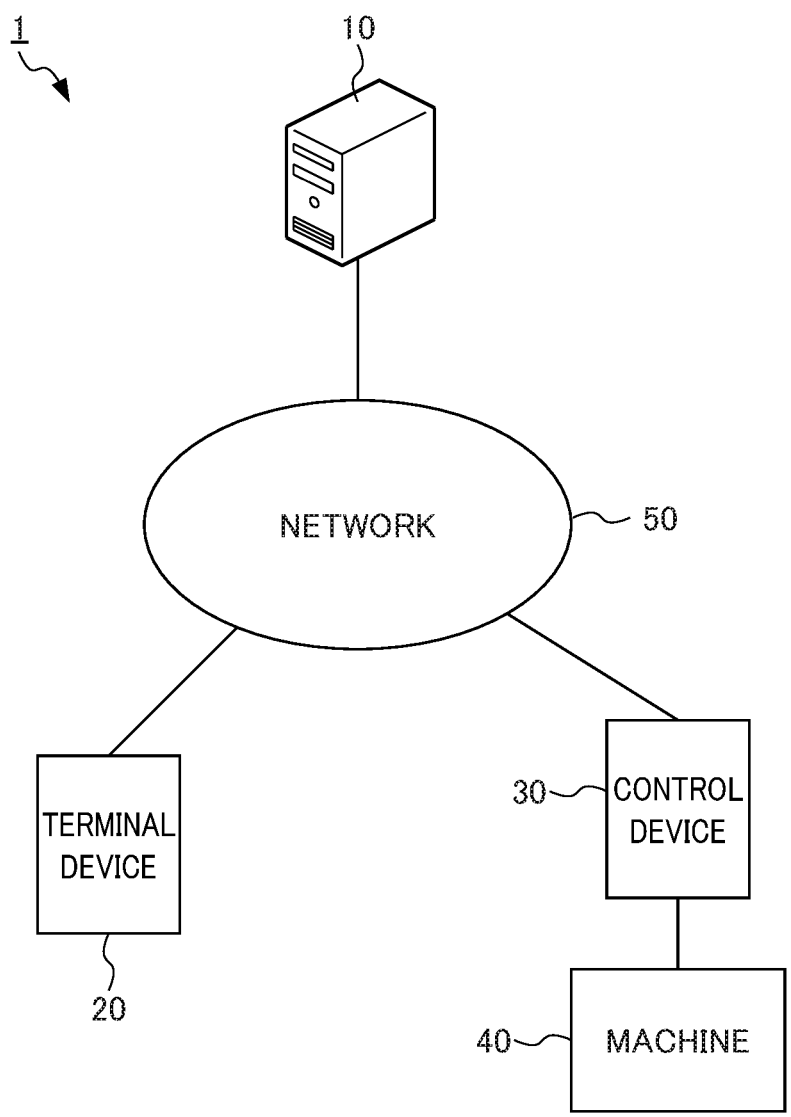
FIG. 1 is a schematic diagram illustrating a system configuration of a guidance information presentation system according to an embodiment of the present invention.

FIG. 1 is a schematic diagram illustrating a system configuration of a guidance information presentation system 1 according to an embodiment of the present invention.

As illustrated in FIG. 1, the guidance information presentation system 1 includes a server 10, a terminal device 20, a control device 30, and a machine 40. The server 10, the terminal device 20, and the control device 30 are configured to be able to communicate with each other via a network 50 such as the Internet, a wired network, or a wireless LAN (Local Area Network). Further, the control device 30 and the machine 40 are configured to be able to communicate with each other via networks such as wired or wireless LANs or communication cables such as USB (Universal Serial Bus) cables. Although not illustrated, the guidance information presentation system 1 includes a plurality of servers 10, terminal devices 20, control devices 30, and machines 40, as appropriate, depending on the specifications of the systems and the like.

The server 10 is configured by an information processing apparatus such as a personal computer or a server apparatus, and integrally manages information related to, for example, an apparatus configuration, an operating state, an operation history, and generation of and recovery from a malfunction of the control device 30 and the machine 40 included in the guidance information presentation system 1. In the present embodiment, the malfunction indicates various events that hinder normal operation of the apparatus due to a failure of the apparatus or the like. For example, in a case in which a malfunction occurs in the control device 30 or the machine 40, the server 10 specifies a factor of the malfunction, generates guidance information for the assistance in performing a recovery operation from the malfunction, and transmits the guidance information to the terminal device 20 by executing a program for guidance information presentation processing which is described later.

The terminal device 20 is configured by an information processing apparatus such as a smart glass, a tablet terminal, or a smart phone, and is used by an operator for performing the recovery operation in the guidance information presentation system 1. For example, when a malfunction occurs in the control device 30 or the machine 40, the terminal device 20 receives an operation for requesting the server 10 to present guidance information, and requests the server 10 to present guidance information. Upon receiving the guidance information from the server 10, the terminal device 20 guides the operator to the location where the malfunction is occurring (where the cause of the malfunction is visible) while ensuring the safety of the operator on the basis of the received guidance information, and displays specific operational contents for eliminating the malfunction.

The control device 30 controls the operation of the machine 40 and manages the operating state of the machine 40. In addition, the control device 30 sequentially transmits information indicating the operating state of the machines 40 to the server 10.

Here, the machine 40 refers to a manufacturing machine including, for example, a machine tool, an industrial robot (hereinafter, referred to as "robot"), and an industrial machine. The control device 30 refers to a control device for controlling a machine 40, such as a CNC (Computerized Numerical Controller) apparatus for controlling a machine tool, a robot control device for controlling a robot, a control device for controlling an industrial machine, etc. For example, the machine 40 may be configured with processing equipment for cutting processing or a multi-articulated robot for processing or transporting according to a mounted attachment (a drill, a gripper, etc.). The operation of the machine 40 is controlled by the control device 30. In the present embodiment, a CNC device is exemplified as the control device 30, and a machine tool is exemplified as the machine 40. However, this is non-limiting, as described above. For example, a robot control device may be applied as the control device 30, and a robot or the like may be applied as the machine 40. Although not illustrated, the machine 40 may include the control device 30.

Figure 2:
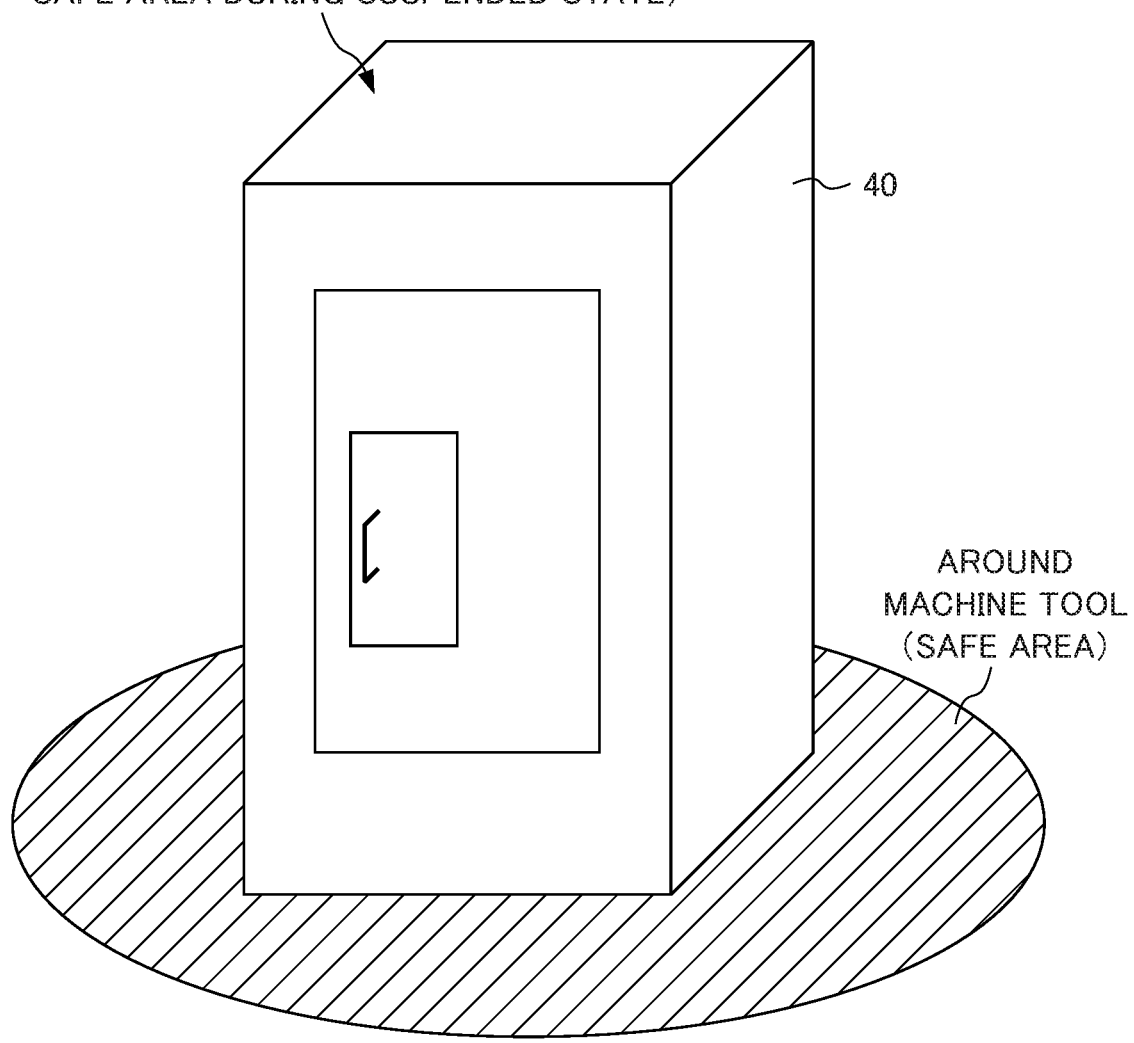
FIG. 2 is a schematic diagram illustrating a safe area set in a machine tool.
Figure 3:
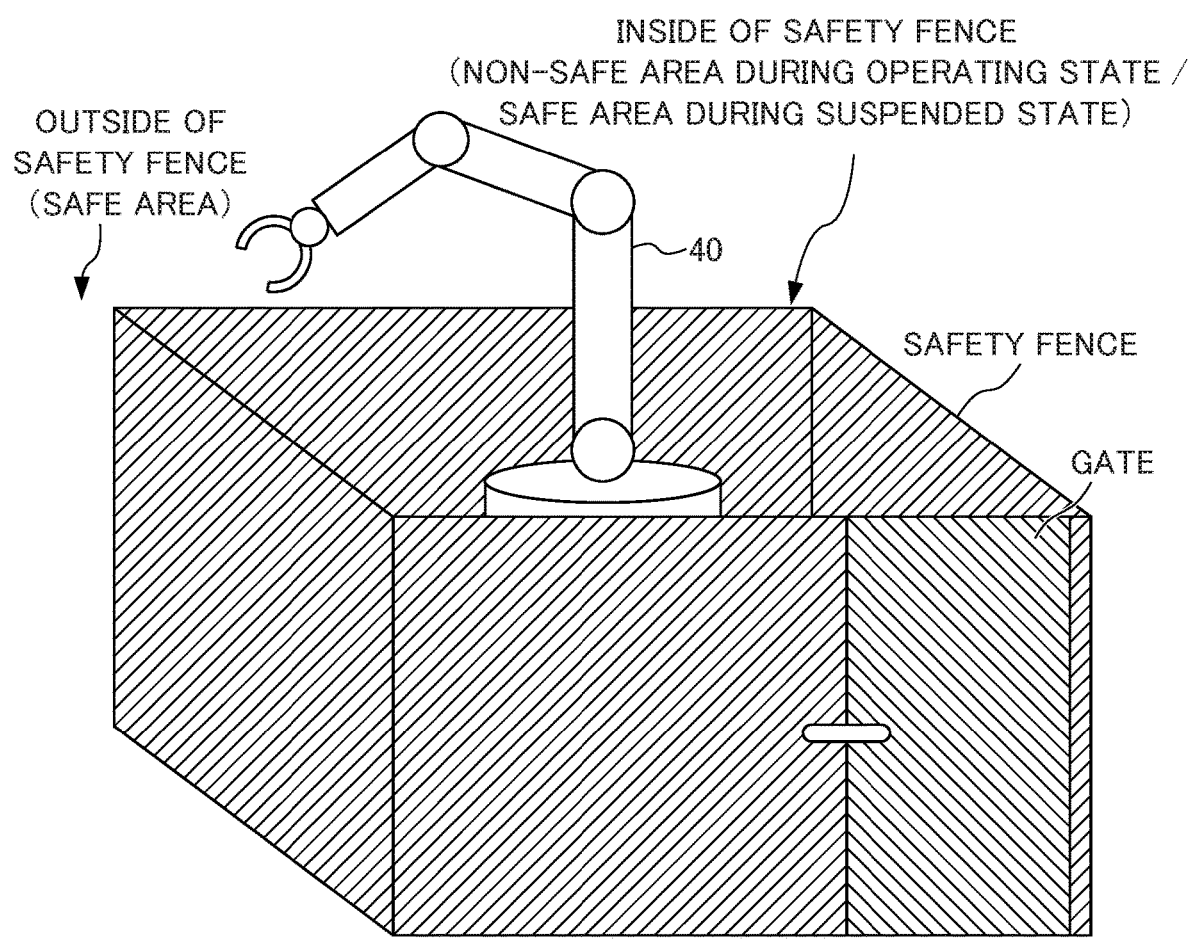
FIG. 3 is a schematic diagram illustrating a safe area set in a robot.

In the present embodiment, a safe area in which the operator can safely enter and a non-safe area in which the operator cannot safely enter are set around the machine 40. FIGS. 2 and 3 are schematic diagrams each illustrating a safe area set in the machine tool and the robot. As illustrated in FIG. 2, in a case in which the machine tool is processing equipment that performs cutting processing and a stage to be processed is covered with a housing (a movable portion is not exposed to the outside), the periphery of the machine tool is set as a safe area during both the operating state and the suspended state of the machine tool. In contrast, the inside of the housing (processing area) of the machine tool is set as a non-safe area during the operating state of the machine tool, and is set as a safe area during the suspended state of the machine tool.

Further, as illustrated in FIG. 3, in a case in which the machine 40 is a robot such as a multi-articulated robot and is surrounded by a safety fence (the movable portion is exposed to the outside and the safety fence is installed around the periphery), the outside of the safety fence is set as a safe area during both the operating state and the suspended state of the robot. In contrast, the inside of the safety fence is set as a non-safe area during the operating state of the robot, and is set as a safe area during the suspended state of the robot. It should be noted that the suspended state of the machine 40 does not simply indicate a state in which the movable portion of the machine 40 is stopped, but indicates a state in which it is guaranteed that the movable portion of the machine 40 does not move owing to a safety signal, interlock, or the like. It should be noted that the safety fence is provided with an interlock function, and when the gate of the safety fence is opened, the robot installed inside the safety fence is configured to suspend its operation. In other words, the inside of the safety fence is changed from the non-safe area to the safe area by the operator performing the operation of opening the gate of the safety fence.

In the present embodiment, in a case of generating guidance information for assisting a recovery operation for a malfunction of the control device 30 and the machine 40, the server 10 provides route guidance so that the operator moves in the safe area. Further, in a case in which the location where the malfunction has occurred is in the non-safe area, the server 10 generates an operation for changing the non-safe area to a safe area as guidance information and urges the operator to perform the operation. For example, the server 10 instructs the operation of opening the gate of the safety fence of the machine 40 or instructs the operation of stopping the power supply of the machine 40 in the guidance information.

(Configuration of Server 10)

Figure 4:
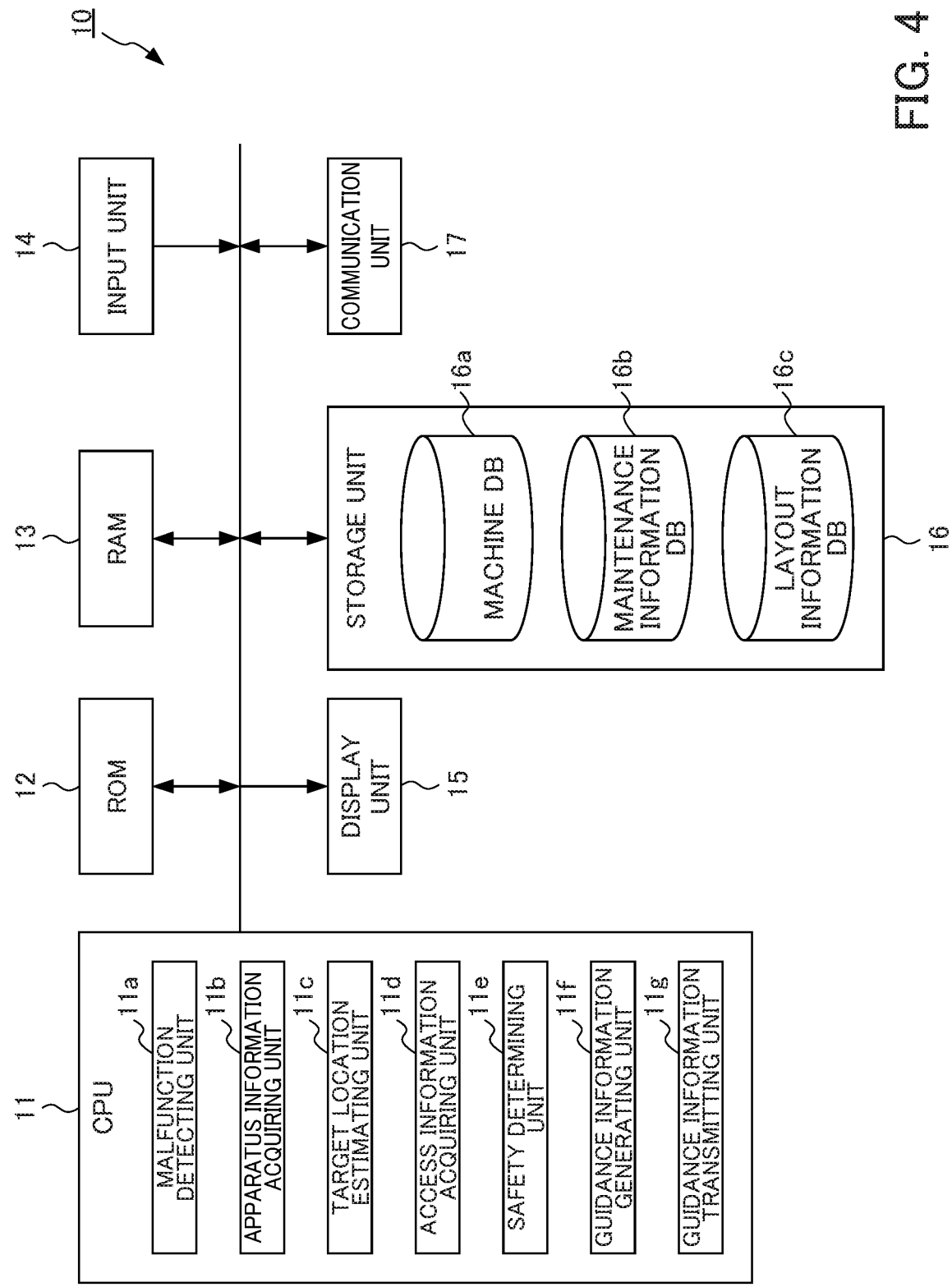
FIG. 4 is a block diagram illustrating a configuration of a server.

Next, the configuration of the server 10 will be described. FIG. 4 is a block diagram illustrating the configuration of the server 10. As illustrated in FIG. 4, the server 10 includes a central processing unit (CPU) 11, ROM 12, RAM 13, an input unit 14, a display unit 15, a storage unit 16, and a communication unit 17.

The CPU 11 controls the entire server 10 by executing various programs stored in the storage unit 16. For example, the CPU 11 executes programs for processing of generating guidance information for the assistance in performing a recovery operation from the malfunction and transmitting the guidance information to the terminal device 20 (hereinafter also referred to as "guidance information presentation processing"). By executing the programs for the guidance information presentation processing, a malfunction detecting unit 11a, an apparatus information acquiring unit 11b, a target location estimating unit 11c, an access information acquiring unit 11d, a safety determining unit 11e, a guidance information generating unit 11f, and a guidance information transmitting unit 11g are formed in the CPU 11 as functional configurations.

The malfunction detecting unit 11a detects the occurrence of a malfunction in the control device 30 or the machine 40. For example, in a case in which it is notified from the control device 30 that manages the machine 40 that a malfunction has occurred in the control device 30 or the machine 40 (for example, in a case in which an error code indicating the type of the device ID and the malfunction), the malfunction detecting unit 11a detects the occurrence of the malfunction in the control device 30 or the machine 40. Further, the malfunction detecting unit 11a detects the generation of the malfunction in the control device 30 in a case in which the transmission of the information from the control device 30 is interrupted.

Further, in a case in which the malfunction detecting unit 11a detects the generation of the malfunction in the control device 30 or the machine 40, the malfunction detecting unit 11a specifies an operator who is to be in charge of the recovery operation, and notifies the terminal device 20 used by the operator of the need for the recovery operation. It should be noted that the malfunction detecting unit 11a can also detect that the malfunction has occurred in the control device 30 or the machine 40 in a case in which an assistance request for the recovery operation transmitted from the terminal device 20 used by the operator performing the recovery operation is received. This allows the assistance for the recovery operation to be provided even when the operator detects the occurrence of the malfunction, for example.

The apparatus information acquiring unit 11b refers to a machine database 16a and a maintenance information database 16b, which will be described later, for the control device 30 or the machine 40 in which the generation of the malfunction has been detected by the malfunction detecting unit 11a, and acquires information relating to the apparatus configuration, the operating state, and the operation history of the control device 30 or the machine 40 (hereinafter, also referred to as "target apparatus information"). The information of the device configurations of the control device 30 and the machine 40 includes information such as components included in these devices, images of the installation locations of the components, component numbers for identifying the components, and replacement methods of the components.

The target location estimating unit 11c estimates a target location that is a cause of the malfunction in the control device 30 or the machine 40 in which a request for the recovery was generated has been detected. For example, the target location estimating unit 11c can estimate a component that is the cause of the malfunction on the basis of the error code indicating the type of the malfunction transmitted from the control device 30. At this time, the target location estimating unit 11c refers to the maintenance information database 16b described later, and searches for a malfunction corresponding to the same error code that occurred previously and a component that has been repaired or replaced in the recovery operation, thereby making it possible to estimate the component that is the cause of the currently occurring malfunction. In a case in which a particular error code is not transmitted from the control device 30, the target location estimating unit 11c acquires information indicating a phenomenon of the malfunction that is currently occurring, and can estimate the component that is the cause of the malfunction on the basis of the acquired information indicating the phenomenon. The information indicating the phenomenon of the currently occurring malfunction can be obtained by the operator inputting the information, reading an error message captured by an image acquiring unit 21c described later, an indication of seven-segment LEDs, or the like, or analyzing an operation state by the target location estimating unit 11c transmitting test signals to the control device 30 and the machine 40. Then, the target location estimating unit 11c refers to the maintenance information database 16b, which will be described later, and can estimate the component which is the cause of the currently occurring malfunction by searching for the previous malfunction in which the same malfunction phenomenon has occurred and the component which has been repaired or replaced in the recovery operation.

The access information acquiring unit 11d refers to a layout information database 16c, which will be described later, and acquires information (hereinafter, also referred to as "access information") which allows the operator to reach the component that is the cause of the malfunction estimated by the target location estimating unit 11c. In the present embodiment, the access information indicates information relating to an operation procedure and a moving route with which, for example, the operator moves from the front of the machine tool (the location in front of the machine tool in a passage) to the installation location of the component that causes the malfunction (the back surface of the machine tool, etc.) so that the component that causes the malfunction becomes visible (for example, a state in which a door is opened so that the component becomes visible).

The safety determining unit 11e determines the safety of the access information acquired by the access information acquiring unit 11d. More specifically, the safety determining unit 11e determines whether there is a portion corresponding to the non-safe area set in the machine tool, for example, in the moving route and the operation procedure in the access information. The safety determining unit 11e determines the safety of the respective portions of the moving route and the operation procedure in the access information. It should be noted that the determination result of the safety determining unit 11e is also referred to as "safety information" hereinafter.

The guidance information generating unit 11f generates guidance information which allows the operator to repair or replace the component that is the cause of the malfunction on the basis of the access information acquired by the access information acquiring unit 11d and the safety information determined by the safety determining unit 11e. The guidance information includes, for example, information for guiding the operator to the route from, for example, the front of the machine tool to the installation location of the component that is the cause of the malfunction (hereinafter also referred to as "guidance information of the route"), information for providing the operation procedure so that the component that is the cause of the malfunction becomes visible for the operator (hereinafter, also referred to as "guidance information of the operation procedure"), and information for guiding the operator to easily identify the component that is the cause of the malfunction (hereinafter referred to as "guidance information of the component identification").

Specifically, the guidance information of the route includes the safety information relating to the moving route and the respective portions of the moving route, and includes a handling instruction that allows the operator to perform an operation such as waiting until a route corresponding to a non-safe area becomes a safe area, or changing the non-safe area to a safe area. Similarly, the guidance information of the operation procedure includes the operation procedure for visually recognizing the component and the safety information of the respective portions of the operation procedure, and also includes a handling instruction that allows the operator to perform an operation such as waiting, with regard to the operation procedure relating to the non-safe area, until a non-safe area becomes a safe area, or changing the non-safe area to a safe area. In addition, the guidance information of the component identification includes information for highlighting the component that is the cause of the malfunction so that the operator can easily identify the component. It should be noted that, as the guidance information of the component identification, the guidance information may include a schematic diagram, a moving image, or the like that illustrates the replacement operation (removal of screws, removal of the component, attachment of the replacement component, screwing, etc.) of the component which is the cause of the failure.

In addition, the guidance information generating unit 11f determines whether a change has occurred in the guidance information on the basis of the operating state of the control device 30 and the machine 40, and in a case in which a change has occurred in the guidance information, the guidance information generating unit 11f notifies the terminal device 20 of the change in the guidance information via the guidance information transmitting unit 11g. In a case of notifying the change in the guidance information, it is possible for the guidance information generating unit 11f to perform push notification to the terminal device 20, or it is also possible to respond to the change in the guidance information in a case in which a request for confirmation relating to the change of the guidance information is made from the terminal device 20. The guidance information transmitting unit 11g transmits the guidance information generated by the guidance information generating unit 11f and the information relating to the change of the guidance information to the terminal device 20.

Various system programs for controlling the server 10 are written in advance in the ROM 12. The RAM 13 is composed of semiconductor memory such as DRAM (Dynamic Random Access Memory), and stores data generated when the CPU 11 executes various types of processing. The input unit 14 is configured by an input apparatus such as a keyboard, a mouse, or a touch sensor (a touch screen), and receives the input of various types of information to the server 10 by a user.

The display unit 15 is configured by a display device such as a Liquid Crystal Display (LCD), and displays the results of various types of processing performed by the server 10. The storage unit 16 is configured by a non-volatile storage device such as a hard disk or flash memory, and stores programs and the like for the guidance information presentation processing. In addition, the storage unit 16 stores: a machine database (machine DB) 16a in which information related to the device configurations of the control device 30 and the machine 40 included in the guidance information presentation system 1 is stored; a maintenance information database (maintenance information DB) 16b in which information related to the operation history and the recovery history of the control device 30 and the machine 40 included in the guidance information presentation system 1 is stored; and a layout information database (layout information DB) 16c in which information related to the layout of a factory having the control device 30 provided therein included in the guidance information presentation system 1 is stored. Furthermore, the storage unit 16 stores results of various types of processing of the server 10, such as guidance information generated by the guidance information generating unit 11f.

The communication unit 17 includes a communication interface for performing signal processing on the basis of a predetermined communication standard, such as wired or wireless LAN, USB, or the like, and controls communication performed by the server 10 with other devices.

(Configuration of Terminal Device 20)

Figure 5:
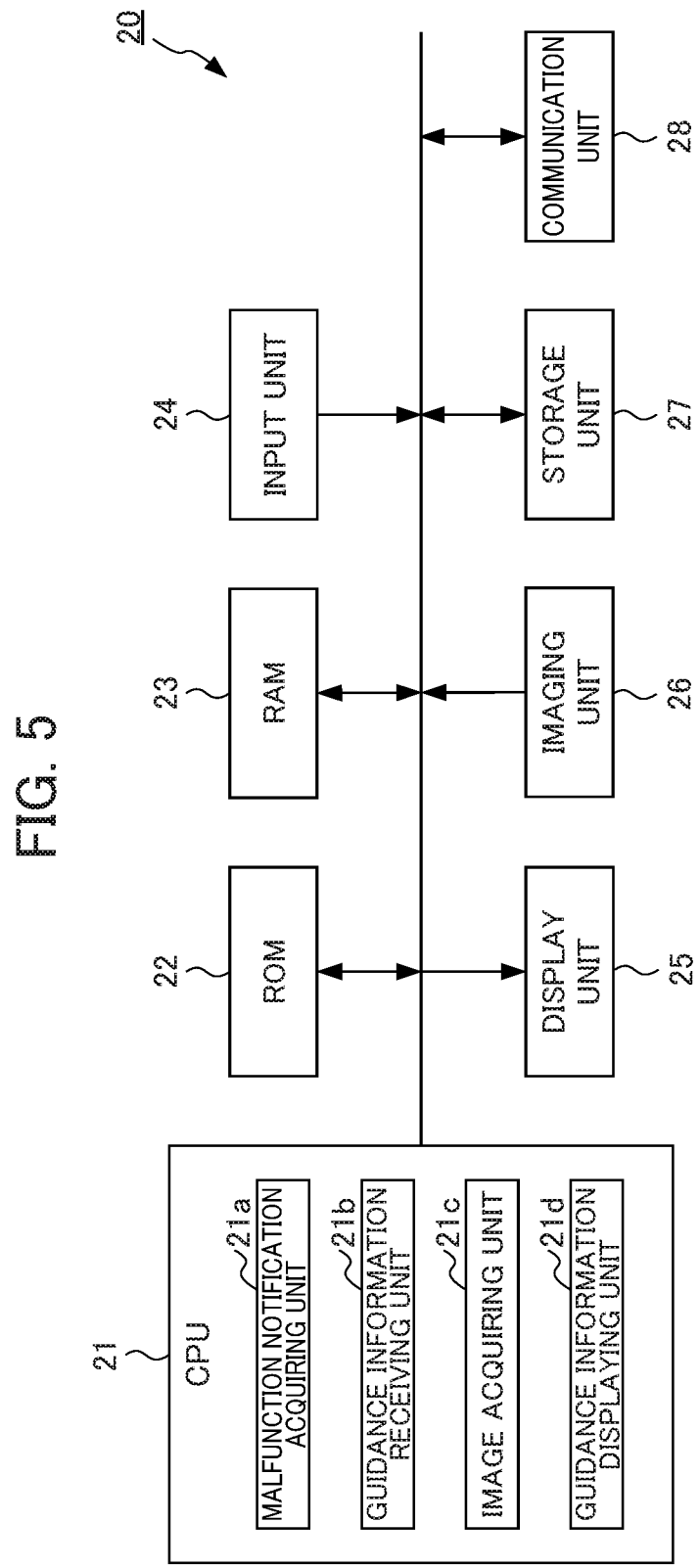
FIG. 5 is a block diagram illustrating a configuration of a terminal device.

Next, the configuration of the terminal device 20 will be described. FIG. 5 is a block diagram illustrating the configuration of the terminal device 20. As illustrated in FIG. 5, the terminal device 20 includes a CPU 21, ROM 22, RAM 23, an input unit 24, a display unit 25, an imaging unit 26, a storage unit 27, and a communication unit 28.

The CPU 21 controls the entire terminal device 20 by executing various programs stored in the storage unit 27. For example, the CPU 21 executes, on the basis of the guidance information transmitted from the server 10, a program for processing of guiding the operator to assist the operator in performing the recovery operation (hereinafter, also referred to as "guidance information display processing"). By executing the program for the guidance information display processing, the malfunction notification acquiring unit 21a, the guidance information receiving unit 21b, the image acquiring unit 21c, and the guidance information displaying unit 21d are formed in the CPU 21 as functional configurations.

The malfunction notification acquiring unit 21a acquires, from the server 10, a notification indicating that the malfunction of the control device 30 or the machine 40 has occurred. Thereafter, the malfunction notification acquiring unit 21a notifies the operator using the terminal device 20 of the occurrence of the malfunction and the fact that the operator is in charge of performing the recovery operation, by performing screen display, outputting sounds, or the like. In the case in which the operator is notified as being the operator in charge of the recovery operation, the operator starts the recovery operation to the malfunction. It should be noted that the recovery operation may be started by the operator who was notified that he/she is in charge of the recovery operation sending, to the server 10, a reply which indicates that he/she accepts being in charge.

The guidance information receiving unit 21b receives, from the server 10, guidance information for the recovery operation of the notified malfunction. As described above, the guidance information received at this time includes, for example, the guidance information of a route for guiding the operator from the front of the machine tool to the installation location of the component which is the cause of the malfunction, the guidance information of the operation procedure for providing the operation procedure so that the component which is the cause of the malfunction becomes visible for the operator, and the guidance information of component identification for guiding the operator to easily identify the component which is the cause of the malfunction. In addition, the guidance information receiving unit 21b receives, from the server 10, information relating to the change of the guidance information.

In a case in which the operator using the terminal device 20 performs the recovery operation, the image acquiring unit 21c successively acquires captured images around the operator captured by the imaging unit 26. On the basis of the guidance information received by the guidance information receiving unit 21b and the captured images acquired by the image acquiring unit 21c, the guidance information displaying unit 21d performs screen display to assist the operator in repairing or replacing the components that are the cause of the malfunction. In the present embodiment, the guidance information displaying unit 21d recognizes a subject in the captured image to identify which object the subject is, and displays the subject in the captured image and the guidance information in association with each other.

For example, the guidance information displaying unit 21d superimposes information (arrows, messages, lines indicating the route, etc.) indicating a route along which the operator should advance on the captured images on the basis of the guidance information of the route included in the guidance information, and displays the superimposed information. In addition, the guidance information displaying unit 21d superimposes, on the captured images, and displays the information indicating the operation procedure (highlighted display of an operation target location (surrounded by a frame, displayed with colors, displayed with light emission, etc.) and guidance of the operation procedure (urging the user to open a rear door, etc.)) so that the component that is the cause of the malfunction becomes visible for the operator on the basis of the guidance information of the operation procedure included in the guidance information. Further, the guidance information displaying unit 21d superimposes, on the captured image, and displays the information representing visual effects (surrounding the area of the component in the captured image with a frame, displaying with colors, displaying with light emission, etc.) that allows the operator to identify the component that is the cause of the malfunction on the basis of the guidance information of the component identification included in the guidance information.

Figure 6:
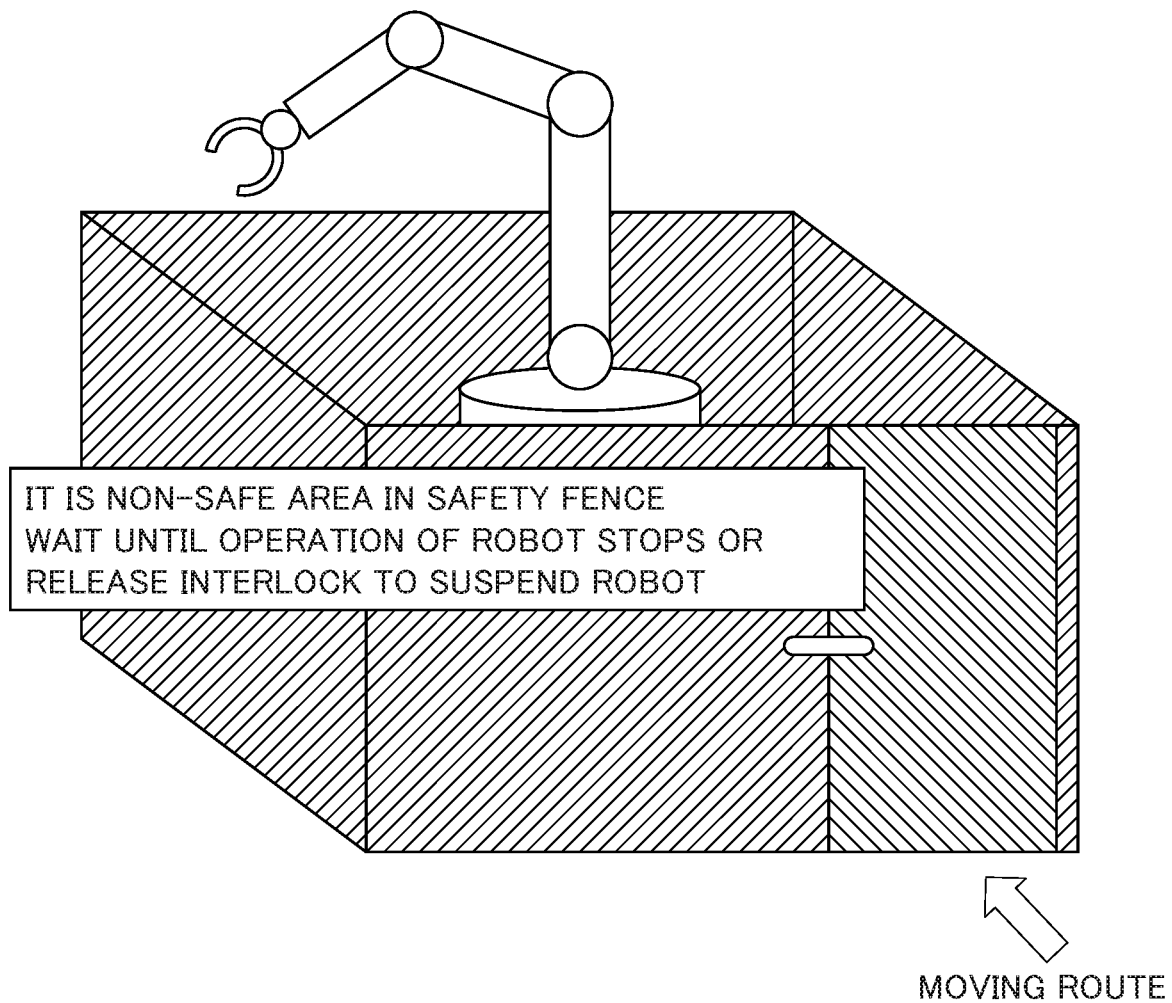
FIG. 6 is a schematic diagram illustrating an example of route guidance information.
Figure 7:
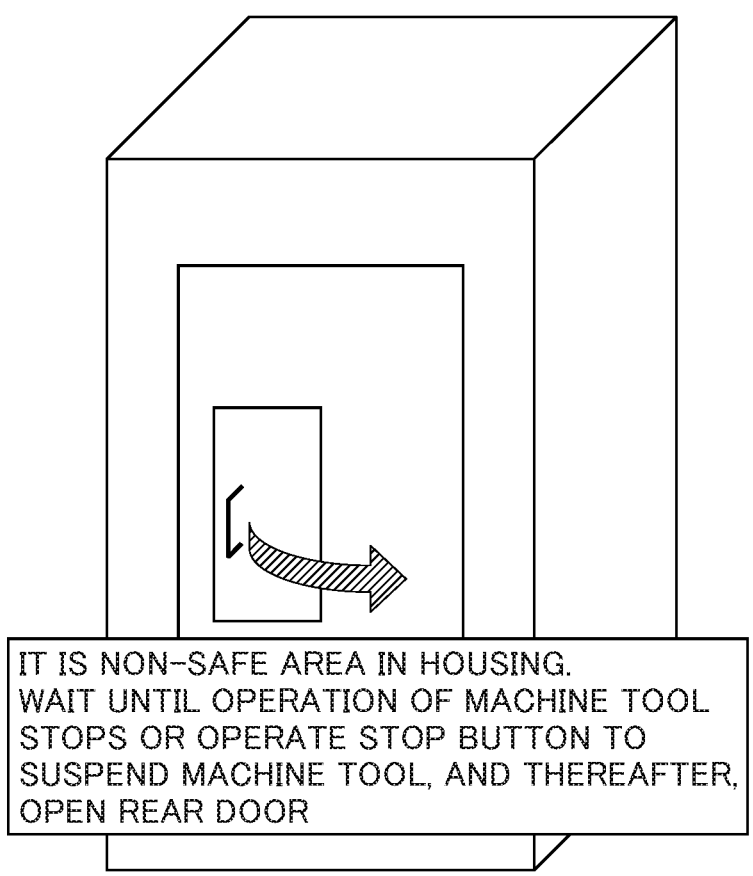
FIG. 7 is a schematic diagram illustrating an example of guidance information for an operation procedure.
Figure 8:
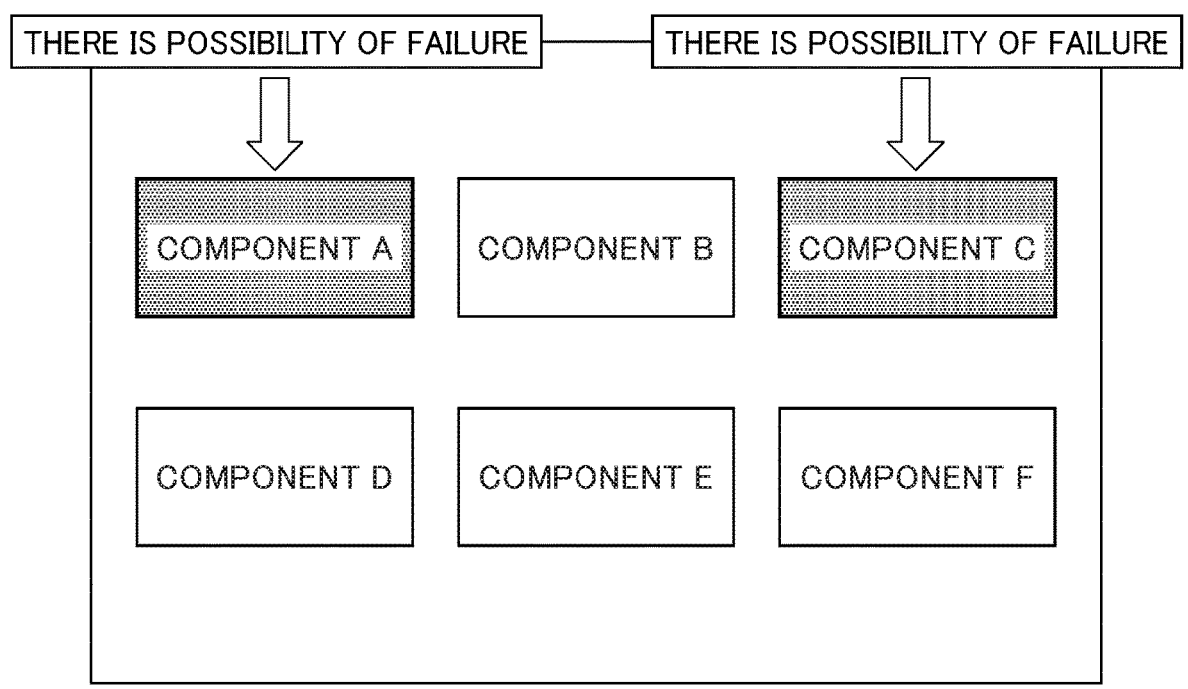
FIG. 8 is a schematic diagram illustrating an example of guidance information for component identification.

FIGS. 6 to 8 are each a schematic diagram illustrating an example of the guidance information displayed in the terminal device 20. FIG. 6 is a schematic diagram illustrating an example of the guidance information of a route. FIG. 7 is a schematic diagram illustrating an example of the guidance information of an operation procedure. FIG. 8 is a schematic diagram illustrating an example of the guidance information of component identification. In FIG. 6, as the guidance information of the route, guidance information relating to a moving route around a robot is displayed, and an instruction is displayed which notifies the operator that the inside of the safety fence which is a moving route is a non-safe area, the operator should wait outside the safety fence until the operation of the robot stops, or the operator is supposed to suspend the operation of the robot by releasing the interlock of the safety fence.

In FIG. 7, as the guidance information of the operation procedure, the guidance information relating to the operation procedure provided so that the component which is the cause of the malfunction becomes visible for the operator is displayed, and an instruction is displayed which notifies the operator that the inside of the housing of the machine tool in which the component which is the cause of the malfunction is installed is a non-safe area, the operator should wait outside the safety fence until the operation of the machine tool stops, or the operator is supposed to suspend the operation of the machine tool by operating a stop button. In FIG. 8, as the guidance information for the component identification, the guidance information representing visual effects for the operator to identify the component that is the cause of malfunction in a machine tool, for example, is displayed, images of the component A and the component C on a printed circuit board are highlighted, and a message is displayed which notifies the operator that there is a high possibility of failure between the images.

That is, in the present embodiment, the guidance information displaying unit 21d can display guidance information using AR (Augmented Reality) for captured images. However, the guidance information displaying unit 21d may add the guidance information to a schematic diagram of the control device 30, the machine 40, or the like and display the guidance information, without using ARs, thereby performing screen display to assist the operator in performing the recovery operation.

Various system programs for controlling the terminal device 20 are written in advance in the ROM 22. The RAM 23 is composed of semiconductor memory such as a DRAM, and stores data generated when the CPU 21 executes various processes. The input unit 24 is configured by an input device such as a touch sensor, and receives inputs of various types of information to the terminal device 20 by a user.

The display unit 25 is configured by a display device such as an LCD, and displays results of various types of processing of the terminal device 20. It should be noted that, in the present embodiment, a touch screen is configured by arranging the input unit 24 on the display unit 25 in a superimposed manner.

The imaging unit 26 includes an image sensor such as a CMOS (Complementary Metal Oxide Semiconductor) and acquires data of a captured image of a subject image. The storage unit 27 is configured by a non-volatile storage device such as a hard disk or flash memory, and stores programs and the like for the guidance information display processing. The communication unit 28 includes a communication interface for performing signal processing on the basis of a predetermined communication standard, such as wired or wireless LAN or USB, and controls communication performed between the terminal device 20 and another device.

(Operation)

Next, an operation of the guidance information presentation system 1 will be described.

(Guidance Information Presentation Processing)

Figure 9:
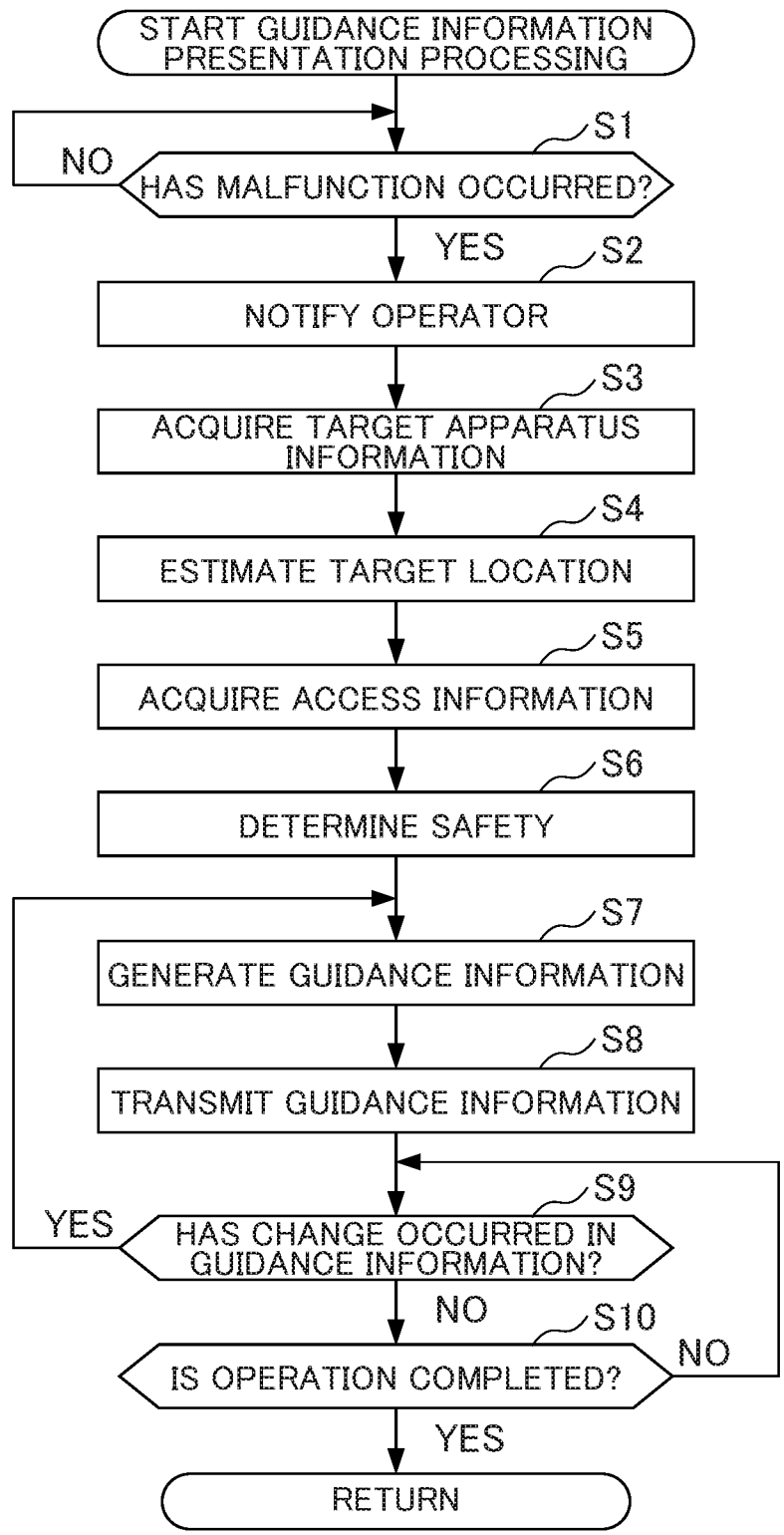
FIG. 9 is a flowchart for explaining a flow of guidance information presentation processing executed by the server.

First, the guidance information presentation processing executed by the server 10 will be described. FIG. 9 is a flowchart for explaining the flow of the guidance information presentation processing executed by the server 10. The guidance information presentation processing is started when an instruction to start the guidance information presentation processing is inputted via the input unit 14.

When the guidance information presentation processing is started, in Step S1, the malfunction detecting unit 11a determines whether or not a malfunction has occurred in the control device 30 or the machine 40. In a case in which no malfunction has occurred in the control device 30 or the machine 40, it is determined as NO in Step S1, and the processing of Step S1 is repeated. In contrast, in a case in which a malfunction has occurred in the control device 30 or the machine 40, it is determined as YES in Step S1, and the processing advances to Step S2.

In Step S2, the malfunction detecting unit 11a specifies the operator in charge of the recovery operation, and notifies the terminal device 20 used by the operator of the necessity of the recovery operation. In Step S3, the apparatus information acquiring unit 11b refers to the machine DB 16a and the maintenance information DB 16b for the control device 30 or the machine 40 in which the malfunction has been detected by the malfunction detecting unit 11a, and acquires the target device information of the control device 30 or the machine 40. In Step S4, the target location estimating unit 11c estimates the target location that is the cause of the malfunction in the control device 30 or the machine 40 in which the occurrence of the malfunction has been detected.

In Step S5, the access information acquiring unit 11d refers to the layout information DB 16c, and acquires access information that allows the operator to reach the component that is the cause of the malfunction as estimated by the target location estimating unit 11c. In Step S6, the safety determining unit 11e determines safety in the access information acquired by the access information acquiring unit 11d. In Step S7, the guidance information generating unit 11f generates guidance information that allows the operator to repair or replace the component that is the cause of the malfunction on the basis of the access information acquired by the access information acquiring unit 11d and the safety information determined by the safety determining unit 11e.

In Step S8, the guidance information transmitting unit 11g transmits the guidance information generated by the guidance information generating unit 11f to the terminal device 20. In Step S9, the guidance information generating unit 11f determines whether a change has occurred in the guidance information on the basis of the operating state of the control device 30 and the machine 40. In a case in which the guidance information has changed on the basis of the operating state of the control device 30 and the machine 40, it is determined as YES in Step S9, and the processing advances to Step S7. In contrast, in a case in which the guidance information has not changed on the basis of the operating state of the control device 30 and the machine 40, it is determined as NO in Step S9, and the processing advances to Step S10.

In Step S10, the guidance information generating unit 11f determines whether or not the recovery operation by the operator has completed. Whether or not the recovery operation by the operator has completed can be determined by inputting a message indicating the completion of the recovery operation by the operator, receiving a signal notifying the recovery from the control device 30, or the like. In a case where the recovery operation by operator has not been completed, it is determined as NO in Step S10, and the processing advances to Step S9. In contrast, in a case in which the recovery operation by the operator has completed, it is determined as YES in Step S10, and the guidance information presentation processing is repeated.

(Guidance Information Display Processing)

Figure 10:
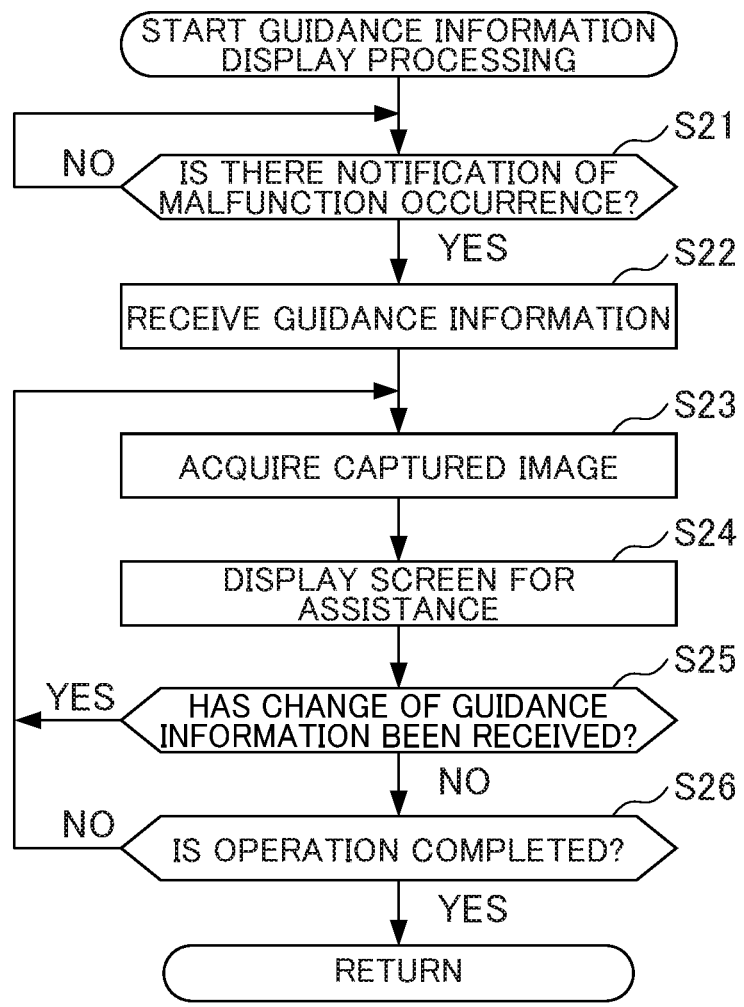
FIG. 10 is a flowchart for explaining a flow of guidance information display processing executed by the terminal device.

Next, the guidance information display processing executed by the terminal device 20 will be described. FIG. 10 is a flowchart for explaining a flow of the guidance information display processing executed by the terminal device 20. The guidance information display processing is started when an instruction to start the guidance information display processing is inputted via the input unit 24.

When the guidance information display processing is started, in Step S21, the malfunction notification acquiring unit 21a determines whether or not a notification indicating that the malfunction of the control device 30 or the machine 40 has occurred has been acquired from the server 10. In a case in which no notification indicating that the malfunction of the control device 30 or the machine 40 occurred has been acquired from the server 10, it is determined as NO in Step S21, and the processing of Step S21 is repeated. In contrast, in a case in which the notification indicating that the malfunction of the control device 30 or the machine 40 occurred has been acquired from the server 10, it is determined as YES in Step S21, and the processing advances to Step S22.

In Step S22, the guidance information receiving unit 21b receives, from the server 10, guidance information for the recovery operation of the notified malfunction. In Step S23, the image acquiring unit 21c acquires a captured image of around the operator captured by the imaging unit 26. In Step S24, the guidance information displaying unit 21d performs screen display (see FIGS. 6 to 8) for assisting the operator in repairing or replacing components that are responsible for the malfunction on the basis of the guidance information received by the guidance information receiving unit 21b and the captured image acquired by the image acquiring unit 21c.

In Step S25, the guidance information displaying unit 21d determines whether or not the information relating to the change of the guidance information has been received by the guidance information receiving unit 21b. In a case in which the information relating to the change of the guidance information has been received by the guidance information receiving unit 21b, it is determined as YES in Step S25, and the processing advances to Step S23. In contrast, in a case in which the information relating to the change of the guidance information has not been received by the guidance information receiving unit 21b, it is determined as NO in Step S25, and the processing advances to Step S26.

In Step S26, the guidance information displaying unit 21d determines whether or not the recovery operation by the operator has been completed. Whether or not the recovery operation by the operator has been completed can be determined on the basis of whether or not an operation of inputting a message indicating the completion of the recovery operation by the operator has been performed. In a case in which the recovery operation by operator has not been completed, it is determined as NO in Step S26, and the processing advances to Step S23. In contrast, in a case in which the recovery operation by the operator has been completed, it is determined as YES in Step S26, and the guidance information display processing is repeated.

As described above, in the guidance information presentation system 1 according to the present embodiment, when a malfunction occurs in the control device 30 or the machine 40, the guidance information is generated for assisting the operator in performing the recovery operation from the malfunction. The guidance information includes the access information for the operator to reach the component that is the cause of the malfunction, and the determination result of the safety in the access information. Then, the generated guidance information is transmitted to the terminal device 20, and the screen display for the assistance in performing the recovery operation of the operator is performed. Therefore, the operator can easily grasp the safe route to the target location of the recovery operation, and it is possible to make the component which is the cause of the malfunction become visible for the operator easily and safely. Therefore, according to the guidance information presentation system 1, it is possible to more appropriately assist in performing the recovery operation of the device.

In the guidance information presentation system 1, in a case in which the operator reaches the target location of the recovery operation, which component is the cause of the malfunction is displayed in an identifiable manner. Therefore, the operator can easily identify the components to be repaired or replaced in the recovery operation, and can perform the recovery operation more efficiently.

Second Embodiment

Next, a second embodiment of the present invention will be described. A guidance information presentation system 1 according to the present embodiment differs from the guidance information presentation system 1 according to the first embodiment in that the guidance information presentation system 1 according to the present embodiment generates guidance information for guiding an operator located at a remote location in the factory from the control device 30 or the machine 40 which is a target of a recovery operation to the location of the control device 30 or the machine 40 which is the target of the recovery operation. In the guidance information presentation system 1 according to the present embodiment, the hardware configurations of the server 10 and the terminal devices 20 are the same as the hardware configurations of the first embodiment. Hereinafter, functional configurations of the server 10 and the terminal device 20 differing from those of the first embodiment will be described. In the following description, portions differing from those of the first embodiment will be mainly described, and the description of the first embodiment will be referred to for portions similar to those of the first embodiment as appropriate.

(Configuration of Server 10)

Figure 11:
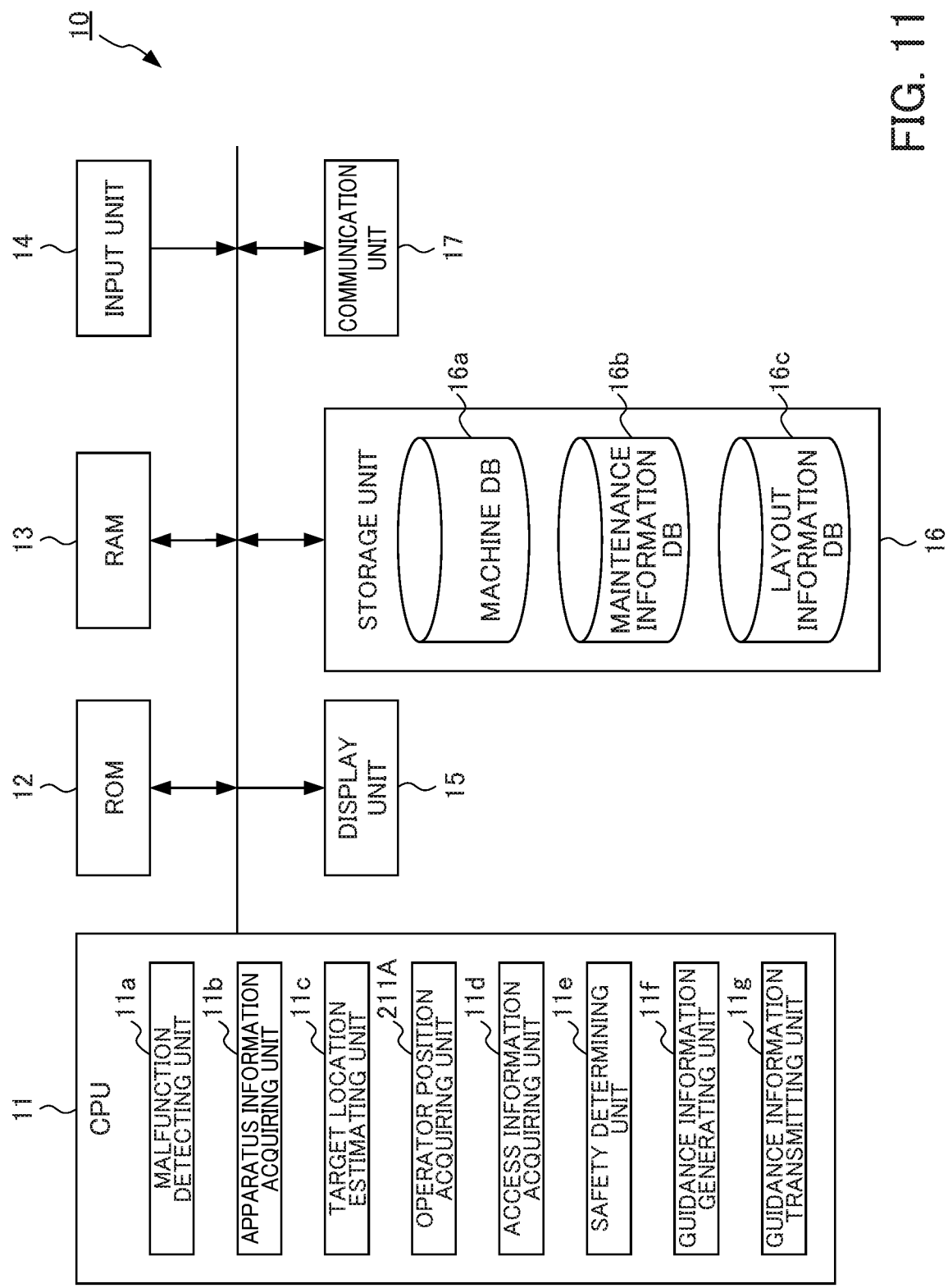
FIG. 11 is a block diagram illustrating a configuration of a server according to a second embodiment.

FIG. 11 is a block diagram illustrating a configuration of the server 10 according to the second embodiment. As illustrated in FIG. 11, in the present embodiment, the CPU 11 of the server 10 controls the entire server 10 by executing programs for the guidance information presentation processing. At this time, the malfunction detecting unit 11a, the apparatus information acquiring unit 11b, the target location estimating unit 11c, an operator location acquiring unit 211A, the access information acquiring unit 11d, the safety determining unit 11e, the guidance information generating unit 11f, and the guidance information transmitting unit 11g are formed in the CPU 11 of the server 10 as functional configurations.

Among these, the operator location acquiring unit 211A acquires information of the current location in a factory detected by the terminal device 20 used by the operator. The access information acquiring unit 11d refers to the layout information database 16c, and acquires the access information for the operator to reach the component that is the cause of the malfunction as estimated by the target location estimating unit 11c. In the present embodiment, the access information indicates information relating to an operation procedure and a moving route with which, for example, the operator moves from the current location of the operator to the location of the control device 30 or the machine 40 that is a target of the recovery operation, and further, for example, in the case of a machine tool, the operator moves to the installation location (for example, the back surface of the machine tool, etc.) of the component that is the cause of the malfunction in the machine tool so that the component that is the cause of the malfunction becomes visible (for example, a state in which a door is opened so that the component becomes visible).

Here, in a case of setting a moving route from the current location of the operator to the location of the control device 30 or the machine 40 that is the target of the recovery operation, it is assumed that a plurality of moving routes can be set within the layout of the factory. In this case, in the present embodiment, one moving route is selected on the basis of a preset selection criterion, such as a moving route having the shortest moving distance or a moving route considered to have higher safety. However, it is also possible to select a plurality of moving routes that can be set, and to generate guidance information on the basis of the respective moving routes.

The safety determining unit 11e determines the safety of the access information acquired by the access information acquiring unit 11d. Specifically, the safety determining unit 11e determines whether or not there is a portion corresponding to a non-safe area set in the machine 40 in the moving route and the operation procedure in the access information. The safety determining unit 11e determines the safety of the respective portions of the moving route and the operation procedure in the access information.

In the present embodiment, since the moving route in the access information includes the moving route from the current location of the operator to the location of the control device 30 or the machine 40 as a recovery target, the safety determining unit 11e determines whether or not there is a portion corresponding to the non-safe area also in the respective portions of the moving route. For example, in a case in which an area other than a pathway in the factory is set as a moving route in the moving route from the current location of the operator to the location of the control device 30 or the machine 40 as a recovery target, the safety is determined on the basis of the operating state of the machine 40 in the vicinity of the area other than the pathway.

Figure 12:
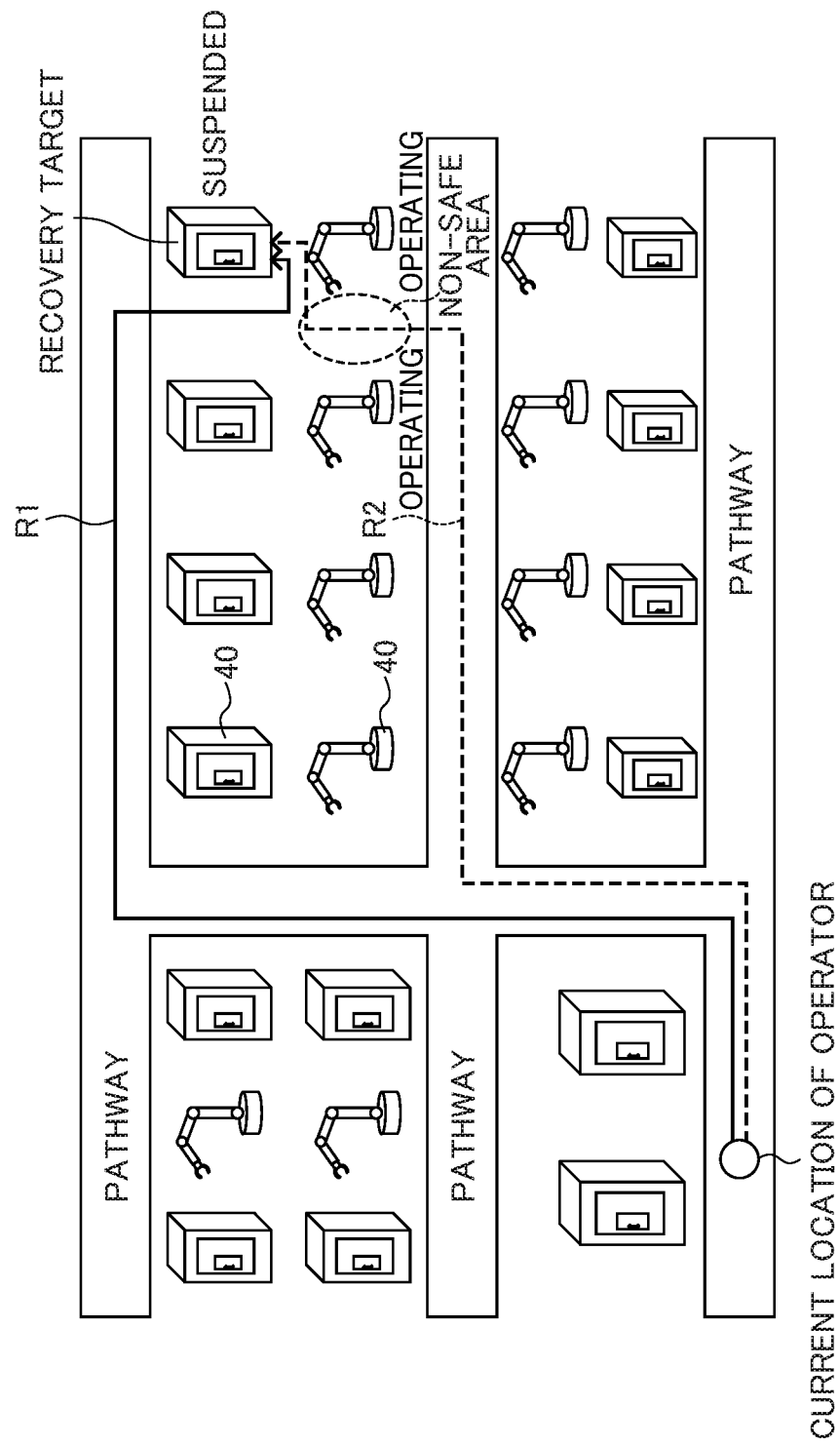
FIG. 12 is a schematic diagram illustrating an example of access information including a moving route from a current location of an operator to a location of a CNC apparatus or a machine tool as a recovery target.

FIG. 12 is a schematic diagram illustrating an example of access information including a moving route from a current location of an operator to a location of a CNC apparatus or a machine tool as the recovery target. In FIG. 12, a pathway in the factory is always determined to be a safe area, and the area other than the pathway is either the safe area or the non-safe area on the basis of the operating state of the machine 40 therearound. For example, in FIG. 12, the solid-line route R1 is a moving route in the factory to the front of the CNC apparatus or the machine tool as the recovery target, and is also a moving route that goes around the machine tool of which the operation is suspended to reach the rear of the machine tool. Therefore, it is determined that all portions of the route R1 correspond to the safe area.

In contrast, a route R2 indicated by a broken line in FIG. 12 is a moving route that passes through an area between the robots in operation from a pathway in the factory and reaches the back surface of the CNC apparatus or machine tool as a recovery target. Therefore, in the route R2, it is determined that the portion of the moving route between the robots in operation corresponds to the non-safe area. In the present embodiment, in a case in which two of the route R1 and the route R2 become candidates for the moving route, the route R1 which is considered to be higher in safety is selected.

On the basis of the access information acquired by the access information acquiring unit 11d and the safety information determined by the safety determining unit 11e, the guidance information generating unit 11f generates guidance information (route guidance information, operation procedure guidance information, and component identification guidance information) for the operator to repair or replace the component that is the cause of the malfunction. In the present embodiment, the route guidance information includes the access information including the moving route from the current location of the operator to the location of the control device 30 or the machine 40 as a recovery target, and the safety information of the access information.

(Configuration of Terminal Device 20)

FIG. 13 is a block diagram illustrating a configuration of the terminal device 20 according to the second embodiment. As illustrated in FIG. 13, in the present embodiment, the CPU 21 of the terminal device 20 executes programs for the guidance information display processing to thereby control the entire terminal device 20. At this time, the malfunction notification acquiring unit 21a, a current location acquiring unit 221A, the guidance information receiving unit 21b, the image acquiring unit 21c, and the guidance information displaying unit 21d are formed as functional configurations in the CPU 21 of the terminal device 20.

Among these, the current location acquiring unit 221A acquires information on the current location of the terminal device 20 in the factory. The current location acquiring unit 221A transmits the acquired information of the current location in the factory to the server 10 when the server 10 requests the information to be transmitted. As a technique for acquiring the current location of the terminal device 20, various known techniques can be used. For example, it is possible to configure such that radio waves transmitted from the terminal device 20 are received by a plurality of (for example, four) radio receivers (radio base stations, etc.) and the location of the terminal device 20 is specified on the basis of triangulation using the difference in radio wave arrival times that have reached the respective radio base stations (radio wave arrival time difference method).

In addition, the radio waves transmitted from the terminal device 20 may be received by the radio base station, and the location of the terminal device 20 may be specified on the basis of the intensity of the radio waves received from the radio terminal and the radio wave intensity map or triangulation acquired in advance (radio wave intensity system). Further, a beacon system may be applied. In such a case, a beacon unit installed in the factory may receive radio waves, infrared rays, or the like (beacon) emitted from the terminal device 20 used by the operator, thereby acquiring the identification information of the terminal device 20 and measuring the location of the terminal device 20 (the operator). It should be noted that, in a case in which a general-purpose positioning technique such as GPS (Global Positioning System) can be used, the current location may be acquired by these positioning techniques.

On the basis of the guidance information received by the guidance information receiving unit 21b and the captured images acquired by the image acquiring unit 21c, the guidance information displaying unit 21d performs screen display to assist the operator in repairing or replacing the components that are the cause of the malfunction. In the present embodiment, similarly to the first embodiment, the guidance information displaying unit 21d recognizes the subject in the captured image to determine which object the subject is, and displays the subject in the captured image in association with the guidance information, as illustrated in FIGS. 6 to 8.

Further, in the present embodiment, the guidance information displaying unit 21d can display guidance information corresponding to the current location of the terminal device 20 on the basis of information of the current location acquired by the current location acquiring unit 221A. In other words, the terminal device 20 in the present embodiment can display the guidance information based on the current location of the terminal device 20 in addition to the guidance information based on the recognition of the subject in the captured image. This makes it possible to display, for example, in the moving route from the current location of the operator to the location of the control device 30 or the machine 40 as the recovery target, guidance information based on the current location of the terminal device 20, and guidance information based on the recognition of the subject in the captured images from the vicinity of the control device 30 or the machine 40 as the recovery target to the target location which is the cause of malfunction.

With such a configuration, the server 10 executes guidance information generation processing in the same manner as in the first embodiment. However, in the guidance information generation processing in the present embodiment, when the access information acquiring unit 11d acquires the access information in Step S5, the current location of the operator acquired by the operator location acquiring unit 211A is acquired, and the access information including the moving route for moving from the current location of the operator to the location of the control device 30 or the machine 40 that is the target of the recovery operation is acquired. Therefore, the guidance information generation processing is executed to generate guidance information that guides the operator located at a remote location in the factory from the control device 30 or the machine 40 which is the target of the recovery operation to the position of the control device 30 or the machine 40 which is the target of the recovery operation. The terminal device 20 having the configuration as described above executes guidance information display processing for displaying guidance information corresponding to the current location while sequentially acquiring the current location of the terminal device 20.

FIG. 14 is a flowchart for explaining the flow of the guidance information display processing executed by the terminal device 20 according to the second embodiment. The guidance information display processing is started when an instruction to start the guidance information display processing is inputted via the input unit 24. When the guidance information display processing is started, in Step S221, the malfunction notification acquiring unit 21a determines whether or not a notification indicating that a malfunction of the control device 30 or the machine 40 has occurred has been acquired from the server 10. If no notification has been acquired from the server 10 that malfunction of the control device 30 or machine 40 has occurred, it is determined as NO in Step S221, and the processing of Step S221 is repeated. In contrast, when the notification is acquired from the server 10 that malfunction of the control device 30 or the machine 40 has occurred, it is determined as YES in Step S221, and the processing advances to Step S222.

In Step S222, the current location acquiring unit 221A acquires information on the current location of the terminal device 20 in the factory, and transmits the acquired information relating to the current location in the factory to the server 10. In Step S223, the guidance information receiving unit 21b receives the guidance information from the server 10 for the recovery operation in response to the notified occurrence of the malfunction. The guidance information received at this time includes the guidance information of the route for guiding the operator to the location of the control device 30 or the machine 40 which is the target of the recovery operation. In Step S224, the image acquiring unit 21c acquires a captured image around the operator captured by the imaging unit 26.

In Step S225, the current location acquiring unit 221A acquires information relating to the current location of the terminal device 20 in the factory. In Step S226, on the basis of the guidance information received by the guidance information receiving unit 21b, the captured images acquired by the image acquiring unit 21c, and the information relating to the current location acquired by the current location acquiring unit 221A, the guidance information displaying unit 21d performs screen display (see FIGS. 6 to 8 and 12) for guiding the operator to the location of the control device 30 or the machine 40 that is the subject of the recovery operation and assisting the operator in repairing or replacing the component that is the cause of the malfunction.

In Step S227, the guidance information displaying unit 21d determines whether or not the information relating to the change of the guidance information has been received by the guidance information receiving unit 21b. In a case in which the guidance information receiving unit 21b receives the information relating to the change of the guidance information, it is determined as YES in Step S227, and the processing advances to Step S224. In contrast, in a case in which the guidance information receiving unit 21b has not received the information relating to the change of the guidance information, it is determined as NO in Step S227, and the processing advances to Step S228.

In Step S228, the guidance information displaying unit 21d determines whether or not the recovery operation by the operator has completed. Whether or not the recovery operation by the operator has completed can be determined on the basis of whether or not an operation of inputting a message indicating the completion of the recovery operation was performed by the operator. In a case in which the recovery operation by operator has not completed, it is determined as NO in Step S228, and the processing advances to Step S224. In contrast, in a case in which the recovery operation by the operator has completed, it is determined as YES in Step S228, and the guidance information display processing is repeated.

As described above, in the guidance information presentation system 1 according to the present embodiment, in a case in which the malfunction occurs in the control device 30 or the machine 40, the guidance information is generated for the assistance in performing the recovery operation from the malfunction by the operator. The guidance information includes the access information for the operator to reach the component that is the cause of the malfunction, and the determination result of the safety in the access information. Further, the guidance information of the present embodiment includes the guidance information of the route for guiding the operator to the location of the control device 30 or the machine 40 which is the target of the recovery operation. Further, the generated guidance information is transmitted to the terminal device 20, and the screen display for assisting the operator in the guidance of the moving route and the recovery operation of the operator according to the current location of the terminal device 20 is performed. Therefore, the operator can easily grasp the safe route from the current location to the location of the control device 30 or the machine 40 as the recovery target and the safe route to the target location of the recovery operation, and it is also possible to make the components that are the cause of the malfunction to become visible to the operator easily and safely. Therefore, according to the guidance information presentation system 1, it is possible to more appropriately assist in performing the recovery operation of the device.

Further, in the guidance information presentation system 1, when the operator reaches the target location of the recovery operation, display is performed which allows the operator to identify which component is the cause of the malfunction. Therefore, the operator can easily specify the component that needs to be repaired or replaced in the recovery operation, and can perform the recovery operation more efficiently.

Third Embodiment

Next, a third embodiment of the present invention will be described. A guidance information presentation system 1 according to the present embodiment differs from the guidance information presentation system 1 in the second embodiment in that the guidance information presentation system 1 according to the present embodiment generates guidance information for guiding an operator located at a remote location in the factory from the control device 30 or the machine 40 which is the target of a recovery operation to the location of the control device 30 or the machine 40 which is the target of a recovery operation after picking up a replacement component required for the recovery operation from a warehouse or the like. In the guidance information presentation system 1 according to the present embodiment, the hardware configurations of the server 10 and the terminal device 20 are the same as the hardware configurations of the first embodiment and the second embodiment. Hereinafter, functional configurations of the server 10 and the terminal device 20 differing from those of the second embodiment will be described. In the following description, portions differing from those of the second embodiment will be mainly described, and the description of the second embodiment will be referred to for portions similar to those of the second embodiment as appropriate.

(Configuration of Server 10)

The configuration of the server 10 in the present embodiment is substantially the same as that in the second embodiment. However, in the functional configuration, the configuration of the access information acquiring unit 11d is different from that of the second embodiment. That is, the access information acquiring unit 11d in the present embodiment refers to the layout information database 16c, and acquires the access information for the operator to reach the component that is the cause of the malfunction estimated by the target location estimating unit 11c. In the present embodiment, the access information indicates the information relating to an operation procedure and a moving route whereby the operator moves from the current location of the operator, picks up a replacement component required for the recovery operation from the warehouse or the like, and then moves to the location of the control device 30 or the machine 40 which is the target of the recovery operation, and for example, in a case in which the machine 40 is a machine tool, and the operator further moves to the installation location (the back surface of the machine tool, etc.) of the component that causes the malfunction in the machine tool so that the component that causes the malfunction becomes visible state (for example, a state in which a door is opened so that the component becomes visible).

Here, in a case of setting the moving route from the current location of the operator to the location of the control device 30 or the machine 40 that is the target of the recovery operation via a warehouse or the like where a replacement component required for the recovery operation is picked up, it is considered that a plurality of moving routes can be set in the layout of the factory. In this case, in the present embodiment, one moving route is selected on the basis of a preset selection criterion, such as a moving route having the shortest moving distance or a moving route considered to have higher safety. However, it is also possible to select a plurality of moving routes that can be set, and to generate the guidance information on the basis of the respective moving routes.

FIG. 15 is a schematic diagram illustrating an example of access information including a moving route from a current location of an operator to a location of a CNC apparatus or a machine tool as the recovery target via a warehouse or the like where a replacement component required for a recovery operation is picked up. As illustrated in FIG. 15, the access information in the present embodiment includes a moving route from the current location of the operator to the location of the CNC apparatus or the machine tool as the recovery target via a warehouse (a storage area) or the like where replacement components required for the recovery operation are stored. In other words, in the guidance information presentation system 1 of the present embodiment, since the target location estimating unit 11c presumes the component that is the cause of the malfunction in advance, the operator picks up a replacement component in advance, and then is guided to the CNC apparatus or the machine tool as the recovery target upon performing the recovery operation.

It should be noted that in FIG. 15, similarly to the second embodiment, the pathway in the factory is always determined to be a safe area, and the areas other than the pathway are either a safe area or a non-safe area, on the basis of the operating state of the machine 40 therearound. For example, in FIG. 15, a solid-line route R3 is a moving route in the factory to the front of the CNC apparatus or the machine tool as the recovery target, and is also a moving route that goes around the machine tool of which the operation is suspended to reach the rear of the machine tool. Therefore, it is determined that all portions of the route R3 correspond to the safe area.

In contrast, a route R4 indicated by a broken line in FIG. 15 is a moving route that passes through an area between the robots in operation from a pathway in the factory and reaches the back surface of the CNC apparatus or machine tool as the recovery target. Therefore, in the route R4, it is determined that the portion of the moving route between the robots in operation corresponds to the non-safe area. In the present embodiment, in a case in which the two of the route R3 and the route R4 become candidates for the moving route, the route R3 which is considered to be higher in safety is selected.

(Configuration of Terminal Device 20)

The configuration of the terminal device 20 in the present embodiment is substantially the same as that in the second embodiment. However, in the functional configuration, the configuration of the malfunction notification acquiring unit 21a is different from that of the second embodiment. That is, the malfunction notification acquiring unit 21a in the present embodiment acquires, from the server 10, a notification indicating that malfunction of the control device 30 or the machine 40 has occurred. Then, the malfunction notification acquiring unit 21a notifies the operator using the terminal device 20 of the occurrence of the malfunction and the fact that the operator is in charge of performing the recovery operation, by performing screen display, outputting sounds, or the like. In a case in which the operator is notified that the operator is in charge of the recovery operation, the operator starts the recovery operation on the malfunction. It should be noted that the recovery operation may be started by the operator who is notified as being in charge of the recovery operation sending a reply which indicates that he/she accepts being in charge to the server 10.

In the present embodiment, in a case in which the malfunction notification acquiring unit 21a acquires the notification that the malfunction of the control device 30 or the machine 40 has occurred from the server 10, the malfunction notification acquiring unit 21a transmits a reply to the server 10 of whether or not to pick up a replacement component for the component which is the cause of the malfunction from the warehouse or the like in response to the operation by the operator. In a case in which the reply to the effect to pick up the replacement component for the component which is the cause of the malfunction from the warehouse or the like is transmitted, the guidance information for the operator to pick up the replacement component required for the recovery operation from the warehouse or the like and guide the operator to the location of the CNC apparatus or the machine tool which is the target of the recovery operation, for example, is transmitted from the server 10 (see FIG. 15). In contrast, in a case in which a reply to the effect not to pick up the replacement component of the component which is the cause of the malfunction from the warehouse or the like is transmitted, similarly to the second embodiment, the guidance information for guiding the operator to the location of the CNC apparatus or the machine tool which is the target of the recovery operation is transmitted from the server 10 (see FIG. 12).

With such a configuration, the server 10 executes the guidance information generation processing in the same manner as in the second embodiment. However, in the guidance information generation processing according to the present embodiment, when the access information acquiring unit 11d acquires the access information in Step S5, the current location of the operator acquired by the operator location acquiring unit 211A is acquired, and the access information including the moving route from the current location of the operator to the location of the control device 30 or the machine 40 as the recovery target via a warehouse or the like where replacement components required for recovery operation are stored is acquired. Therefore, the guidance information generation processing is executed to generate the guidance information for guiding the operator located at a remote location in the factory from the control device 30 or the machine 40 which is the target of the recovery operation to the location of the control device 30 or the machine 40 which is the target of the recovery operation via the warehouse or the like where the replacement components required for recovery operation are stored.

The terminal device 20 configured as described above executes the guidance information display processing in the same manner as in the second embodiment. However, in the guidance information generation processing in the present embodiment, in Step S222, the current location acquiring unit 221A acquires the information of the current location of the terminal device 20 in the factory, transmits the acquired information of the current location in the factory to the server 10, and the malfunction notification acquiring unit 21a transmits a reply to the server 10 of whether or not to pick up a replacement component for the component which is the cause of the malfunction from the warehouse or the like in response to the operation by the operator.

As described above, in the guidance information presentation system 1 according to the present embodiment, in a case in which the malfunction occurs in the control device 30 or the machine 40, the guidance information for the assistance in performing the recovery operation from the malfunction by the operator is generated. The guidance information includes the access information for the operator to reach the component that is the cause of the malfunction, and the determination result of the safety in the access information. Further, the guidance information of the present embodiment includes the guidance information of a route for guiding the operator to the location of the control device 30 or the machine 40 which is the target of the recovery operation via a warehouse or the like where replacement components required for the recovery operation are stored. Then, the generated guidance information is transmitted to the terminal device 20, and the display screen is performed which assists in the guidance of the moving route and the recovery operation by the operator according to the current location of the terminal device 20. Therefore, the operator can easily grasp the safe route from the current location to the location of the control device 30 or the machine 40 as the recovery target and the safe route to the target location of the recovery operation via the warehouse or the like where the replacement components required for the recovery operation are stored, and it is possible to make the component that is the cause of the malfunction become visible for the operator easily and safely. Therefore, according to the guidance information presentation system 1, it is possible to more appropriately assist in performing the recovery operation of the device.

In addition, since the operator can pick up the replacement components and then move to the location of the control device 30 or the machine 40 as a recovery target in the warehouse or the like where the replacement components required for the recovery operation are stored, the recovery operation can be performed more efficiently and quickly. Further, in the guidance information presentation system 1, when the operator reaches the target location of the recovery operation, display is performed which allows the operator to identify which component is the cause of the malfunction. Therefore, the operator can easily specify the components that need to be repaired or replaced in the recovery operation, and can perform the recovery operation more efficiently.

It should be noted that the present invention is not limited to the above-mentioned embodiments and modified examples, and various modifications and variations are possible. For example, in the embodiment described above, the terminal device 20 notifies the operator of the guidance information by displaying the guidance information on the screen, but the guidance information is not limited to this. That is, as a mode of notifying the operator of the guidance information, various notification methods such as sound outputting and lighting of lamps can be used in addition to performing screen display, and a notification method combining these methods can also be used. When the guidance information is notified by screen marking, various forms such as characters, symbols, animations, photographs, moving images, schematic diagram drawings, and the like can be used alone or in combination.

The entirety or part of the functions of the guidance information presentation system 1 of the above-described embodiments (for example, the server 10 and the terminal device 20) can be realized by hardware, software, or a combination thereof. Here, the matter of being realized by software indicates that a processor reads and executes a program. In the case of constituting by hardware, a part or the entirety of the functions of the guidance information presentation system 1 can be constituted by integrated circuits (IC) such as ASIC (Application Specific Integrated Circuit), gate array, FPGA (Field Programmable Gate Array), and CPLD (Complex Programmable Logic Device).

In the case of constituting the entirety or part of the functions of the guidance information presentation system 1 by software, the entirety or part of these functions can be realized by storing information required in computation in DRAM and causing a CPU to operate a program in a computer. The computer is configured by a storage unit such as a hard disk and ROM storing programs encoding the entirety or part of the operations of various servers, DRAM storing the data required in computation, a CPU, and a bus connecting each part.

These programs can be stored using various types of computer readable media, and provided to a computer. The computer readable media includes various types of tangible storage media. The computer readable media includes non-transitory computer readable media. Examples of computer readable media include magnetic recording media (for example, flexible disk, magnetic tape, hard disk drive), magneto-optical recording media (for example, magneto-optical disk), CD-ROM (Read Only Memory), CD-R, CD-R/W, DVD-ROM (Digital Versatile Disk), DVD-R, DVD-RW, and semiconductor memory (for example, mask ROM, PROM (Programmable ROM), EPROM (Erasable PROM), flash ROM, and RAM (random access memory)). In addition, these programs may be distributed to a user's computer through a network by downloading.

The embodiments of the present invention are described above in detailed; however, the above-described embodiments merely show specific examples upon implementing the present invention. The technical scope of the present invention is not to be limited to the above-described embodiments. The present invention can be modified in various ways within a scope not departing from the spirit of the present invention, and these are also encompassed by the technical scope of the present invention.

EXPLANATION OF REFERENCE NUMERALS 1 guidance information presentation system
10 server
20 terminal device
11, 21 CPU
11a malfunction detecting unit
11b apparatus information acquiring unit
11c target location estimating unit
11d access information acquiring unit
11e safety determining unit
11f guidance information generating unit
11g guidance information transmitting unit
21a malfunction notification acquiring unit
21b guidance information receiving unit
21c image acquiring unit
21d guidance information displaying unit
211A operator location acquiring unit
221A current location acquiring unit
12, 22 ROM
13, 23 RAM
14, 24 input unit
15, 25 display unit
16, 27 storage unit 16a machine database
16b maintenance information database
16c layout information database
17, 28 communication unit
26 imaging unit
30 control device
40 machine
50 network

What is claimed is:

1. A guidance information presentation apparatus comprising:
   a guidance information acquiring unit configured to acquire guidance information including access information and safety information, the access information including a moving route to reach an estimated location of a failure in an apparatus as a recovery target, and an operation procedure, the safety information indicating safety of the moving route and the operation procedure in the access information, and
   a guidance information notification unit configured to perform, on a basis of the guidance information, notification for guidance of the moving route to the estimated location of the failure in the apparatus as the recovery target, and the operation procedure, and notification that indicates the safety of the moving route and the operation procedure.

2. The guidance information presentation apparatus according to claim 1, wherein
   the safety information is generated on a basis of an operating state in the apparatus as the recovery target.

3. The guidance information presentation apparatus according to claim 1, wherein
   the safety information is generated on a basis of an operating state of an apparatus in a vicinity of the moving route.

4. The guidance information presentation apparatus according to claim 1, wherein
   the safety information is generated on a basis of whether each portion of pieces of the access information is included in either an area that is determined as being safe irrespective of an operating state of the apparatus, or an area that is determined as being non-safe when the apparatus is in operation and determined as being safe when the operation of the apparatus is suspended.

5. The guidance information presentation apparatus according to claim 1, wherein
   the guidance information notification unit performs notification of at least one of wait until becoming safe or an operation to establish as safe, as the guidance information for a portion that is determined as being non-safe in the access information.

6. The guidance information presentation apparatus according to claim 1,
   further comprising an imaging unit that is configured to capture an image, wherein
   the guidance information notification unit recognizes a subject in the image captured by the imaging unit and displays the guidance information relating to the recognized subject by superimposing the guidance information on the image.

7. The guidance information presentation apparatus according to claim 1, further comprising:
   a location acquiring unit that is configured to acquire a current location of the guidance information presentation apparatus, wherein
   the access information in the guidance information includes a moving route from a current location of the guidance information presentation apparatus acquired by the location acquiring unit to the apparatus as the recovery target.

8. The guidance information presentation apparatus according to claim 7, wherein
   the access information in the guidance information includes a moving route from the current location of the guidance information presentation apparatus acquired by the location acquiring unit to a storage area in which components to be used for recovery operation in the apparatus as the recovery target are stored, and a moving route from the storage area to the apparatus as the recovery target.

9. A guidance information presentation server configured to be communicable with a terminal device, the guidance information presentation server comprising:
   a guidance information generating unit configured to generate guidance information including access information and safety information, the access information including a moving route to reach an estimated location of a failure in an apparatus as a recovery target, and an operation procedure, the safety information indicating safety of the moving route and the operation procedure in the access information, and
   a guidance information transmitting unit configured to transmit, to the terminal device, the guidance information generated by the guidance information generating unit.

10. A guidance information presentation system comprising a server and a guidance information presentation apparatus that are configured to be communicable,
    wherein the server includes:
    a guidance information generating unit configured to generate guidance information including access information and safety information, the access information including a moving route to reach an estimated location of a failure in an apparatus as a recovery target, and an operation procedure, the safety information indicating safety of the moving route and the operation procedure in the access information, and
    a guidance information transmitting unit configured to transmit, to the guidance information presentation apparatus, the guidance information generated by the guidance information generating unit, and
    the guidance information presentation apparatus includes:
    a guidance information receiving unit that is configured to receive the guidance information, and
    a guidance information notification unit that is configured to perform, on a basis of the guidance information received by the guidance information receiving unit, notification for a guidance of the moving route to the estimated location of the failure in the apparatus as the recovery target, and the operation procedure, and notification that indicates the safety of the moving route and the operation procedure.

11. A method of presenting guidance information executed by a computer, the method comprising:
    acquiring guidance information including access information and safety information, the access information including a moving route to reach an estimated location of a failure in an apparatus as a recovery target, and an operation procedure, the safety information indicating safety of the moving route and the operation procedure in the access information, and
    performing, on a basis of the guidance information, notification for a guidance of the moving route to the estimated location of the failure in the apparatus as the recovery target, and the operation procedure, and notification that indicates the safety in the moving route and the operation procedure.

12. A non-transitory computer readable recording medium recording a program that causes a computer to realize:
- a guidance information acquiring function that acquires guidance information including access information and safety information, the access information including a moving route to reach an estimated location of a failure in an apparatus as a recovery target, and an operation procedure, the safety information indicating safety of the moving route and the operation procedure in the access information, and
- a guidance information notification function that performs, on a basis of the guidance information, notification for a guidance of the moving route to the estimated location of the failure in the apparatus as the recovery target, and the operation procedure, and notification that indicates the safety of the moving route and the operation procedure.

* * * * *